United States Patent
Kodani et al.

(10) Patent No.: US 10,108,287 B2
(45) Date of Patent: Oct. 23, 2018

(54) TOUCH PANEL, TOUCH INPUT DEVICE, AND ELECTRONIC DEVICE

(71) Applicant: DAIKIN INDUSTRIES, LTD., Osaka (JP)

(72) Inventors: Tetsuhiro Kodani, Osaka (JP); Eri Mukai, Osaka (JP); Takashi Kanemura, Osaka (JP); Meiten Kou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 37 days.

(21) Appl. No.: 14/913,065

(22) PCT Filed: Oct. 8, 2014

(86) PCT No.: PCT/JP2014/077003
§ 371 (c)(1),
(2) Date: Feb. 19, 2016

(87) PCT Pub. No.: WO2015/053343
PCT Pub. Date: Apr. 16, 2015

(65) Prior Publication Data
US 2016/0202823 A1    Jul. 14, 2016

(30) Foreign Application Priority Data

Oct. 8, 2013 (JP) .................................. 2013-211265
Dec. 10, 2013 (JP) .................................. 2013-255507
Jan. 15, 2014 (JP) .................................. 2014-005178

(51) Int. Cl.
*G06F 3/041* (2006.01)

(52) U.S. Cl.
CPC .................................. *G06F 3/0414* (2013.01)

(58) Field of Classification Search
None
See application file for complete search history.

(56) References Cited

U.S. PATENT DOCUMENTS

| 5,834,650 A | 11/1998 | Kim |
| 2004/0037016 A1* | 2/2004 | Kaneko ................... G06F 3/016 361/1 |
| 2013/0027340 A1 | 1/2013 | Kodani et al. |

FOREIGN PATENT DOCUMENTS

| GB | 1 585 549 | 3/1981 |
| JP | 63-149502 | 6/1988 |

(Continued)

OTHER PUBLICATIONS

Extended European Search Report dated May 4, 2017 in corresponding European Application No. 14851964.8.

(Continued)

*Primary Examiner* — Gustavo Polo
(74) *Attorney, Agent, or Firm* — Wenderoth, Lind & Ponack, L.L.P.

(57) ABSTRACT

A touch panel hardly affected by pyroelectric noise due to temperature includes a first pyroelectric material and a second pyroelectric material, and is capable of detecting press pressure applied to the first pyroelectric material and/or the second pyroelectric material. The upper surface of the first pyroelectric material and the lower surface of the second pyroelectric material are surfaces on which a positive charge is generated when the temperature increases, and a negative charge is generated when the temperature decreases. The lower surface of the first pyroelectric material and the upper surface of the second pyroelectric material are surfaces on which a negative charge is generated when the temperature increases, and a positive charge is generated when the temperature decreases.

15 Claims, 23 Drawing Sheets

(56) References Cited

FOREIGN PATENT DOCUMENTS

| JP | 6-207869 | 7/1994 |
| JP | 2006-163619 | 6/2006 |
| JP | 2011-221720 | 11/2011 |
| JP | 2012-13440 | 1/2012 |

OTHER PUBLICATIONS

International Search Report dated Dec. 22, 2014 in International (PCT) Application No. PCT/JP2014/077003.

* cited by examiner

TOUCH PANEL, TOUCH INPUT DEVICE, AND ELECTRONIC DEVICE

TECHNICAL FIELD

The present invention relates to a touch panel having a piezoelectric material.

BACKGROUND ART

Touch panels having a piezoelectric material have been proposed. When the piezoelectric material is pressed, the piezoelectric material generates a voltage corresponding to the change in strain with time during pressing. PTL 1 discloses a touch panel having a piezoelectric material, which can detect not only a touch position, but also press pressure (i.e., the strength of pressing) applied to the touch panel, by taking advantage of the above characteristics. Moreover, the use of a pyroelectric material, which has a relatively high piezoelectric constant, as the piezoelectric material can increase the sensitivity of detecting press pressure.

CITATION LIST

Patent Literature

PTL 1: JP2006-163619A

SUMMARY OF INVENTION

Technical Problem

However, in a touch panel using a pyroelectric material, when the pyroelectric material undergoes a temperature change, a voltage is generated by the pyroelectric effect, causing noise output (pyroelectric noise). Therefore, changes in the environmental temperature may cause the touch panel to malfunction.

The present invention has been made to solve the above problem. An object of the present invention is to provide a touch panel that is hardly affected by pyroelectric noise due to temperature changes.

Solution to Problem

The touch panel of the present invention is made to solve the above problem, and characterized in that the touch panel comprises sheet-like first and second pyroelectric materials, and is capable of detecting press pressure applied to the first and/or second pyroelectric materials;

wherein a first surface of the first pyroelectric material and a second surface of the second pyroelectric material are surfaces on which a first polar charge is generated when the temperature increases, and a second polar charge opposite to the first polar charge is generated when the temperature decreases;

a second surface of the first pyroelectric material and a first surface of the second pyroelectric material are surfaces on which the second polar charge is generated when the temperature increases, and the first polar charge is generated when the temperature decreases;

an electrode disposed on the first surface of the first pyroelectric material and an electrode disposed on the first surface of the second pyroelectric material are electrically connected to each other; and an electrode disposed on the second surface of the first pyroelectric material and an electrode disposed on the second surface of the second pyroelectric material are electrically connected to each other.

According to this structure, when the temperature increases, the first polar charge generated on the first surface of the first pyroelectric material and the second polar charge generated on the first surface of the second pyroelectric material are at least partially offset, and the second polar charge generated on the second surface of the first pyroelectric material and the first polar charge generated on the second surface of the second pyroelectric material are at least partially offset. Moreover, when the temperature decreases, the second polar charge generated on the first surface of the first pyroelectric material and the first polar charge generated on the first surface of the second pyroelectric material are at least partially offset, and the first polar charge generated on the second surface of the first pyroelectric material and the second polar charge generated on the second surface of the second pyroelectric material are at least partially offset. Therefore, when the temperature increases and decreases, the electric potential difference between the first electrode disposed on the first surface of the first pyroelectric material and the electrode disposed on the first surface of the second pyroelectric material, and the electrode disposed on the second surface of the first pyroelectric material and the electrode disposed on the second surface of the second pyroelectric material is smaller than the electric potential difference between both sides of the first and second pyroelectric materials, thereby suppressing pyroelectric noise generated by the first and second pyroelectric materials. Thus, the touch panel can be hardly affected by pyroelectric noise due to temperature changes.

Moreover, the touch panel of the present invention is made to solve the above problem, and is characterized in that the touch panel comprises sheet-like first and second pyroelectric materials, and is capable of detecting press pressure applied to the first and/or second pyroelectric materials;

wherein a first surface of the first pyroelectric material and a first surface of the second pyroelectric material are surfaces on which a first polar charge is generated when the temperature increases, and a second polar charge opposite to the first polar charge is generated when the temperature decreases;

a second surface of the first pyroelectric material and a second surface of the second pyroelectric material are surfaces on which the second polar charge is generated when the temperature increases, and the first polar charge is generated when the temperature decreases; and electrodes are disposed on the first surface of the first pyroelectric material and the first surface of the second pyroelectric material.

According to this structure, the pyroelectric voltage of the first pyroelectric material and the pyroelectric voltage of the second pyroelectric material are at least partially offset when the temperature changes; therefore, the electric potential difference between the first surface of the first pyroelectric material and the first surface of the second pyroelectric material is smaller than the electric potential difference between both sides of the first and second pyroelectric materials, thereby suppressing pyroelectric noise generated by the first and second pyroelectric materials. Thus, the touch panel can be hardly affected by pyroelectric noise due to temperature changes.

Moreover, in the above touch panel, an electrode disposed on the second surface of the first pyroelectric material and an electrode disposed on the second surface of the second pyroelectric material may be electrically connected to each other.

Moreover, in the above touch panel, the first pyroelectric material and the second pyroelectric material are laminated so that the second surface of the first pyroelectric material and the second surface of the second pyroelectric material are opposite to each other, and a pressure-sensitive adhesive layer or an adhesive layer may be provided between the second surface of the first pyroelectric material and the second surface of the second pyroelectric material.

Moreover, in the above touch panel, the first pyroelectric material and the second pyroelectric material may be placed in parallel.

Moreover, the above touch panel may comprise a plurality of pyroelectric material pairs each comprising a pair of the first pyroelectric material and the second pyroelectric material that are adjacent to each other.

Moreover, in the above touch panel, the first pyroelectric material and the second pyroelectric material may be laminated.

Moreover, in the above touch panel, the first pyroelectric material and the second pyroelectric material preferably have the same shape.

Moreover, in the above touch panel, the first and second pyroelectric materials may be organic piezoelectric films.

Moreover, in the above touch panel, the organic piezoelectric films may be vinylidene fluoride films.

Moreover, in the above touch panel, the organic piezoelectric films may be vinylidene fluoride/tetrafluoroethylene copolymer films.

Moreover, the touch input device of the present invention comprises the touch panel of the present invention, and a pressure detecting unit for detecting press pressure applied to the touch panel based on a signal output from the touch panel.

Furthermore, the technical scope of the present invention also includes an electronic device comprising the touch panel of the present invention, or the touch input device of the present invention.

Advantageous Effects of Invention

The present invention can provide a touch panel that is hardly affected by pyroelectric noise due to temperature changes.

DESCRIPTION OF EMBODIMENTS

Embodiments of the present invention are described below with reference to the attached drawings.

Embodiment 1

Figure 1:
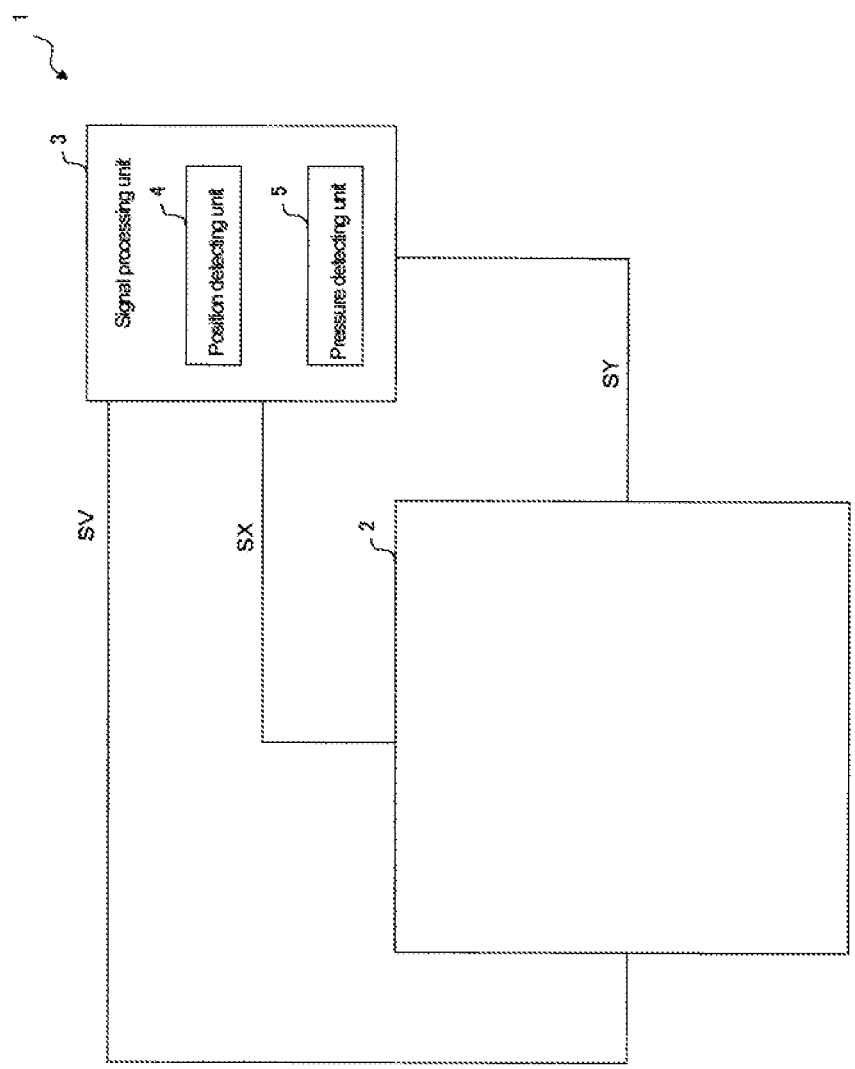
FIG. 1 is a block diagram showing the structure of a touch input device according to Embodiment 1 of the present invention.

FIG. 1 is a block diagram showing the structure of a touch input device 1 according to Embodiment 1 of the present invention. The touch input device 1 has a touch panel 2 and a signal processing unit 3 for processing an output signal of the touch panel 2, and is incorporated in electronic devices, such as mobile phones (e.g., smartphones), personal digital assistants (PDAs), tablet PCs, digitizers, touchpads, ATMs, automatic ticket vending machines, and car navigation systems.

The touch panel 2 is configured to be able to detect a touch position and press pressure applied during the touch operation. The signal processing unit 3 comprises a position detecting unit 4 for detecting a touch position on the touch panel 2, and a pressure detecting unit 5 for detecting press pressure applied to the touch panel 2. A signal SX indicating the X-coordinate of the touch panel 2 and a signal SY indicating the Y-coordinate are input into the position detecting unit 4. Further, the touch panel 2 comprises a pyroelectric material. A voltage signal SV generated by the pyroelectric material is input into the signal processing unit 3. The pressure detecting unit 5 detects press pressure applied to the touch panel 2 based on the voltage signal SV. This enables the detection of not only the presence of touch to the touch panel 2, but also the writing pressure of, for example, a finger or touch pen.

Figure 2:
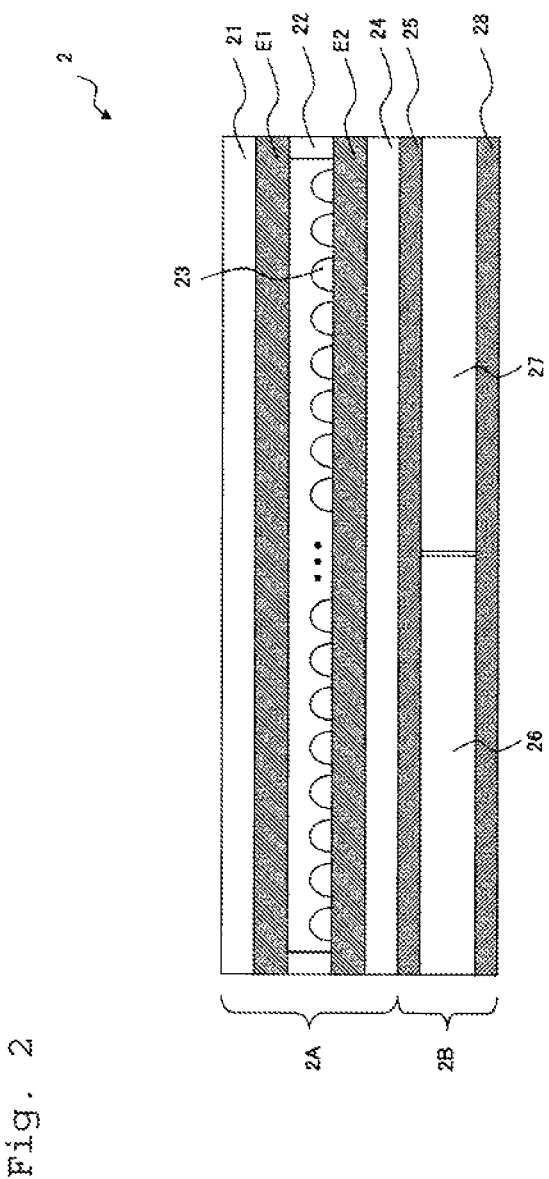
FIG. 2 is a cross-sectional view of the touch panel.

FIG. 2 shows a cross-sectional view of the touch panel 2. As shown in FIG. 2, the touch panel 2 comprises a touch panel structure 2A and a piezoelectric element structure 2B. The touch panel structure 2A outputs a signal indicating a touch position on the touch panel 2. The piezoelectric element structure 2B outputs a signal indicating press pressure applied to the touch panel 2.

The touch panel structure 2A comprises, for example, two transparent electrodes E1 and E2, a protective film 21, a sealing material 22, a spacer 23, and a protective film 24. The transparent electrodes E1 and E2 face each other via the spacer 23. The transparent electrode E1 is covered with the protective film 21, and the transparent electrode E2 is covered with the protective film 24. The transparent electrodes E1 and E2 can be, for example, ITO (indium tin oxide) electrodes or tin oxide electrodes. The touch panel structure 2A may be configured to detect a touch position. Various types of touch panels, such as resistance film-type and capacitance-type touch panels, can be used.

A voltage is applied to the transparent electrodes E1 and E2 from a drive circuit (not shown). When a touch operation is performed on the touch panel 2, the transparent electrodes E1 and E2 are brought into partial contact with each other. The touch panel structure 2A thereby outputs position signals SX and SY, which indicate the touch position, to the signal processing unit 3. The position detecting unit 4 shown in FIG. 1 can detect the touch position on the touch panel 2 based on the position signals SX and SY.

The piezoelectric element structure 2B comprises an upper conductive layer 25, a first pyroelectric material 26, a second pyroelectric material 27, and a lower conductive layer 28. The first pyroelectric material 26 and the second pyroelectric material 27 are transparent pyroelectric materials having piezoelectricity and pyroelectricity. Because the first pyroelectric material 26 and the second pyroelectric material 27 have piezoelectricity, the touch panel 2 comprising the piezoelectric element structure 2B can detect press pressure applied to the first pyroelectric material 26 and/or the second pyroelectric material 27. The first pyroelectric material 26 and the second pyroelectric material 27 can be inorganic piezoelectric films or organic piezoelectric films. Examples of inorganic piezoelectric films include $LiNbO_3$ piezoelectric films, $LiTaO_3$ piezoelectric films, $KNbO_3$ piezoelectric films, ZnO piezoelectric films, AlN piezoelectric films, PZT ($PbZrO_3$—$PbTiO_3$ solid-solution material) piezoelectric films, and the like.

The "organic piezoelectric film" is a film made of a polymer that is an organic substance (polymer film). The "organic piezoelectric film" may contain components other than the polymer. The "organic piezoelectric film" includes a film comprising the polymer, and a film in which the polymer is dispersed in an inorganic substance. Needless to say, the organic piezoelectric film is used after polarization treatment.

The content of the polymer in the piezoelectric film of the present invention is preferably 80 mass % or more, more preferably 85 mass % or more, and even more preferably 90 mass %. The upper limit of the content of the polymer is not particularly limited, and may be 100 mass % or 99 mass %, for example.

Examples of the "organic piezoelectric film" include odd-chain nylon piezoelectric films, vinylidene fluoride polymers, and the like.

The polymer is preferably a vinylidene fluoride polymer.

The piezoelectric film of the present invention preferably comprises a polarized vinylidene fluoride polymer film.

In the present specification, examples of the "vinylidene fluoride polymer film" include vinylidene fluoride/tetrafluoroethylene copolymer films, vinylidene fluoride/trifluoroethylene copolymer films, and polyvinylidene fluoride films.

The vinylidene fluoride polymer film is preferably a vinylidene fluoride/tetrafluoroethylene copolymer film.

The "vinylidene fluoride polymer film" may contain additives generally used in resin films.

The "vinylidene fluoride polymer film" is a film comprising a vinylidene fluoride polymer, and contains a vinylidene fluoride polymer.

Examples of the "vinylidene fluoride polymer" include:

(1) a copolymer of vinylidene fluoride and one or more monomers copolymerizable with vinylidene fluoride, and (2) polyvinylidene fluoride.

Examples of the "monomers copolymerizable with vinylidene fluoride" in the "(1) copolymer of vinylidene fluoride and one or more monomers copolymerizable with vinylidene fluoride" include tri fluoroethylene, tetrafluoroethylene, hexafluoropropylene, chlorotrifluoroethylene, and vinyl fluoride.

The "one or more monomers copolymerizable with vinylidene fluoride" are preferably, or at least one of them is preferably, tetrafluoroethylene.

Preferred examples of the "vinylidene fluoride polymer" include vinylidene fluoride/tetrafluoroethylene copolymers.

The "vinylidene fluoride/tetrafluoroethylene copolymer" may contain repeating units derived from a monomer other than vinylidene fluoride and tetrafluoroethylene, unless the characteristics regarding the present invention are significantly impaired.

The "(1) copolymer of vinylidene fluoride and one or more monomers copolymerizable with vinylidene fluoride" contains 50 mol % or more (preferably 60 mol % or more) of repeating units derived from vinylidene fluoride.

The molar ratio of (repeating units derived from tetrafluoroethylene)/(repeating units derived from vinylidene fluoride) in the "vinylidene fluoride/tetrafluoroethylene copolymer" is preferably within the range of 5/95 to 36/64, more preferably 15/85 to 25/75, and even more preferably 18/82 to 22/78.

The "vinylidene fluoride/tetrafluoroethylene copolymer" may contain repeating units derived from a monomer other than vinylidene fluoride and tetrafluoroethylene, unless the characteristics regarding the present invention are significantly impaired. The content of such repeating units is generally 10 mol % or less. Such monomers are not limited as long as they can be copolymerized with a vinylidene fluoride monomer and a tetrafluoroethylene monomer. Examples thereof include:

(1) fluoromonomers (e.g., vinyl fluoride (VF), trifluoroethylene (TrFE), hexafluoropropene (HFP), 1-chloro-1-fluoro-ethylene (1,1-CFE), 1-chloro-2-fluoro-ethylene (1,2-CFE), 1-chloro-2,2-difluoroethylene (CDFE), chlorotrifluoroethylene (CTFE), trifluorovinyl monomers, 1,1,2-trifluorobutene-4-bromo-1-butene, 1,1,2-trifluorobutene-4-silane-1-butene, perfluoroalkyl vinyl ether, perfluoromethyl vinyl ether (PMVE), perfluoropropyl vinyl ether (PPVE), perfluoroacrylate, 2,2,2-trifluoroethyl acrylate, and 2-(perfluorohexyl)ethyl acrylate); and (2) hydrocarbon monomers (e.g., ethylene, propylene, maleic acid anhydride, vinyl ether, vinyl ester, allyl glycidyl ether, acrylic acid monomers, methacrylic acid monomers, and vinyl acetate.

The organic piezoelectric film of the present invention has a total light transmittance of 90% or more.

The total light transmittance of the organic piezoelectric film of the present invention is preferably 92% or more, and more preferably 95% or more. Although the upper limit of the total light transmittance is not limited, the total light transmittance of the organic piezoelectric film of the present invention is generally 99% or less.

In the present specification, the "total light transmittance" is obtained by a light transmittance test according to ASTM D1003 using a Haze Guard II (product name, Toyo Seiki Seisaku-sho, Ltd.) or an equivalent device.

The total haze of the organic piezoelectric film of the present invention is preferably 3.0% or less.

The total haze of the organic piezoelectric film of the present invention is more preferably 2.0% or less, even more preferably 1.5% or less, and particularly preferably 1.0% or less. The total haze is preferably lower. Although the lower limit is not limited, the total haze of the organic piezoelectric film of the present invention is generally 0.2% or more.

In the present specification, the "total haze" is obtained by a haze (turbidity) test according to ASTM D1003 using a Haze Guard II (product name, Toyo Seiki Seisaku-sho, Ltd.) or an equivalent device.

The inner haze of the organic piezoelectric film of the present invention is preferably 1.2% or less.

The inner haze of the organic piezoelectric film of the present invention is more preferably 1.0% or less, even more preferably 0.9% or less, and particularly preferably 0.8% or less. The inner haze is preferably lower. Although the lower limit is not limited, the inner haze of the organic piezoelectric film of the present invention is generally 0.1% or more.

In the present specification, the "inner haze" is obtained in such a manner that in the above method for measuring the total haze, water is placed in a glass cell, the film is inserted therein, and haze is measured.

The outer haze of the organic piezoelectric film of the present invention is preferably 1.5% or less, more preferably 1.2% or less, and even more preferably 1.0% or less. The outer haze is preferably lower. Although the lower limit is not limited, the outer haze of the organic piezoelectric film of the present invention is generally 0.1% or more.

In the present specification, the "outer haze" is calculated by subtracting the inner haze from the total haze of the film.

The thickness of the organic piezoelectric film of the present invention is generally within the range of 3 to 100 μm, preferably 6 to 50 μm, more preferably 9 to 40 μm, and even more preferably 10 to 30 μm.

The upper conductive layer 25 and the lower conductive layer 28 can be, for example, ITO electrodes or tin oxide electrodes, as with the transparent electrodes E1 and E2. The upper conductive layer 25 and the lower conductive layer 28 are connected to the pressure detecting unit 5 shown in FIG. 1.

Figure 3:
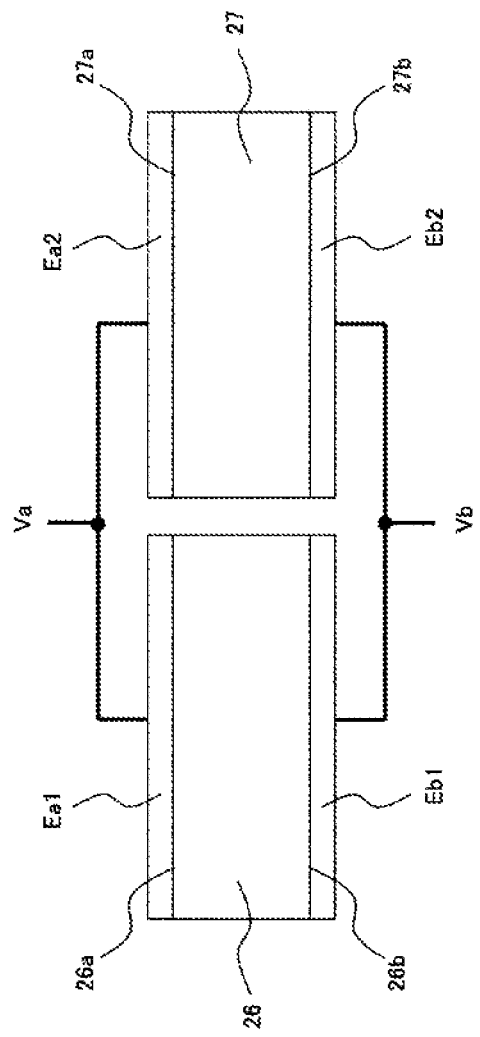
FIG. 3 shows the electrical connection relationship between a first pyroelectric material and a second pyroelectric material.

The first pyroelectric material 26 and the second pyroelectric material 27 are placed in parallel between the upper conductive layer 25 and the lower conductive layer 28. A slight gap is provided between the first pyroelectric material 26 and the second pyroelectric material 27. Thereby, as shown in FIG. 3, an electrode Ea1 disposed on the upper surface 26a (first surface) of the first pyroelectric material 26 and an electrode Ea2 disposed on the upper surface 27a (first surface) of the second pyroelectric material 27 are electrically connected to each other, and an electrode Eb1 disposed on the lower surface 26b (second surface) of the first pyroelectric material 26 and an electrode Eb2 disposed on the lower surface 27b (second surface) of the second pyroelectric material 27 are electrically connected to each other. The electrode Ea1 corresponds to a portion of the upper conductive layer 25 above the first pyroelectric material 26 shown in FIG. 2, and the electrode Ea2 corresponds to a portion of the upper conductive layer 25 above the second pyroelectric material 27. The electrode Eb1 corresponds to a portion of the lower conductive layer 28 below the first pyroelectric material 26, and the electrode Eb2 corresponds to a portion of the lower conductive layer 28 below the second pyroelectric material 27. When the electric potential of the upper surface 26a of the first pyroelectric material 26 and the upper surface 27a of the second pyroelectric material 27 is regarded as Va, and the electric potential of the lower surface 26b of the first pyroelectric material 26 and the lower surface 27b of the second pyroelectric material 27 is regarded as Vb, the piezoelectric element structure 2B outputs the difference between these electric potentials (Va–Vb) as a voltage signal to the pressure detecting unit 5. The pressure detecting unit 5 detects press pressure applied to the touch panel 2 based on the voltage signal. The piezoelectric element structure 2B may be configured to output a current signal.

Figure 4:
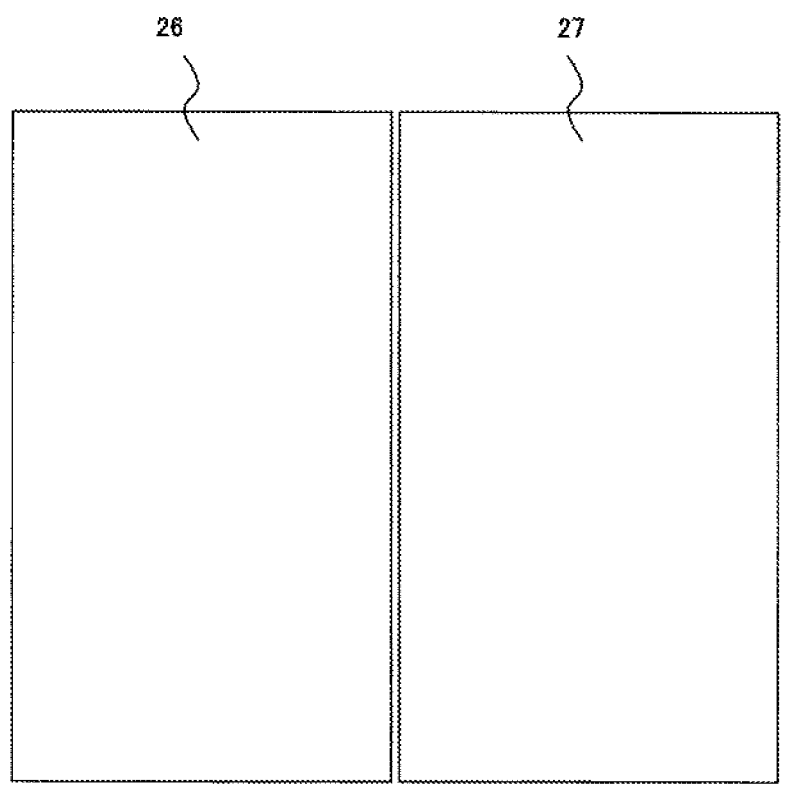
FIG. 4 is a plan view of the first pyroelectric material and the second pyroelectric material.

As shown in FIG. 4, the first pyroelectric material 26 and the second pyroelectric material 27 have the same plan-view shape. Although the plan-view shape of the first pyroelectric material 26 and the second pyroelectric material 27 is not particularly limited, they preferably have a rectangular sheet shape in a plan view. The area of the first pyroelectric material 26 and the second pyroelectric material 27 is about ½ of the area of the upper conductive layer 25 and the lower conductive layer 28. Moreover, in the first pyroelectric material 26 and the second pyroelectric material 27, the more approximate the pyroelectricity, the more approximate the amount of polarization charge generated by the same temperature change. In this embodiment, the amount of polarization charge generated by the same temperature change is almost the same between the first pyroelectric material 26 and the second pyroelectric material 27.

Furthermore, the piezoelectric element structure 2B is configured to be able to cancel pyroelectric noise generated by the pyroelectric effect in the first pyroelectric material 26 and the second pyroelectric material 27 when the environmental temperature changes. Specifically, as shown in FIGS. 5 (a) and (b), the first pyroelectric material 26 and the second pyroelectric material 27 are placed so that the upper surface 26a (first surface) of the first pyroelectric material 26 and the lower surface 27b (second surface) of the second pyroelectric material 27 are surfaces on which a positive charge (first polar charge) is generated when the temperature increases, and a negative charge (second polar charge) is generated when the temperature decreases; and so that the lower surface 26b (second surface) of the first pyroelectric material 26 and the upper surface 27a (first surface) of the second pyroelectric material 27 are surfaces on which a negative charge is generated when the temperature increases, and a positive charge is generated when the temperature decreases.

Figures 5A, 5B:
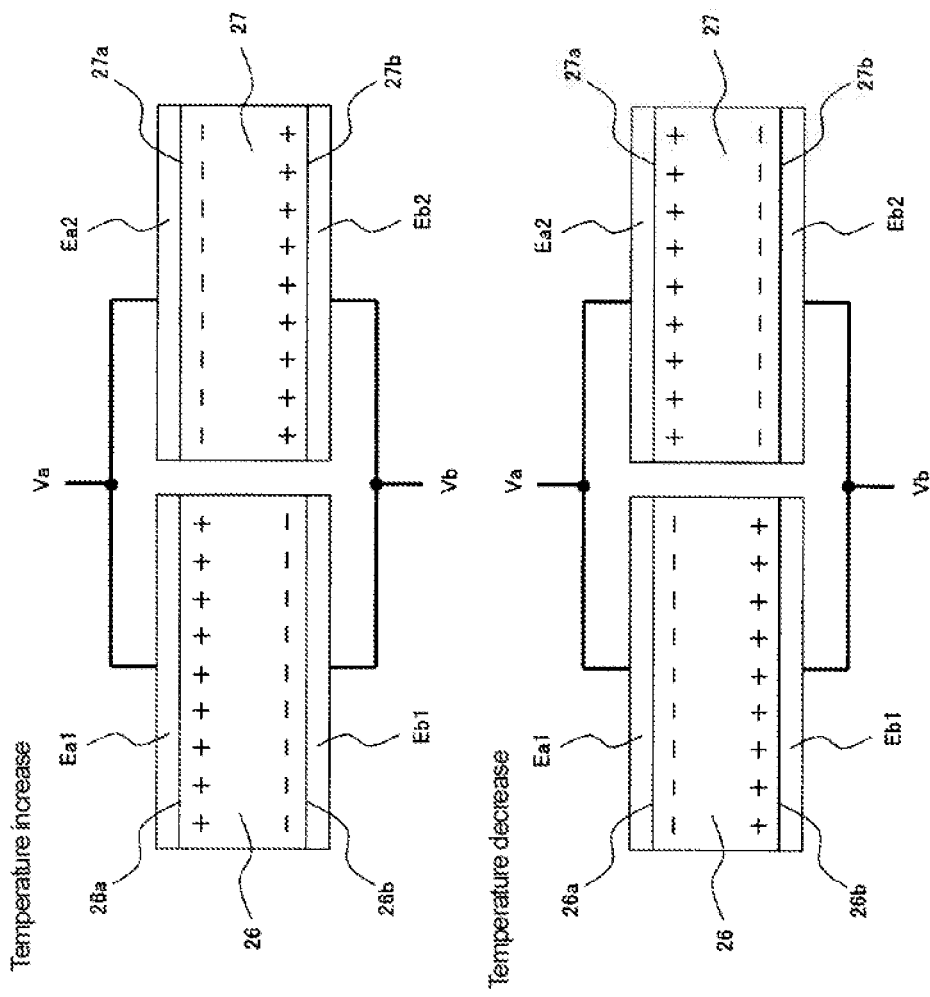
FIGS. 5 (a) and (b) show the polarization state of the first pyroelectric material and the second pyroelectric material when the temperature increases and when the temperature decreases, respectively.

When the temperature increases, as shown in FIG. 5 (a), a positive charge is generated on the upper surface 26a of the first pyroelectric material 26 and the lower surface 27b of the second pyroelectric material 27, and a negative charge is generated on the lower surface 26b of the first pyroelectric material 26 and the upper surface 27a of the second pyroelectric material 27. Since the amount of polarization charge generated by the same temperature change is almost the same between the first pyroelectric material 26 and the second pyroelectric material 27, as described above, the charge of electrode Ea1 and the charge of electrode Ea2 are offset, and the charge of electrode Eb1 and the charge of electrode Eb2 are offset. Therefore, pyroelectric noise detected by the pressure detecting unit 5 can be reduced.

Moreover, when the temperature decreases, as shown in FIG. 5 (b), a negative charge is generated on the upper surface 26a of the first pyroelectric material 26 and the lower surface 27b of the second pyroelectric material 27, and a positive charge is generated on the lower surface 26b of the first pyroelectric material 26 and the upper surface 27a of the second pyroelectric material 27. Accordingly, as with when the temperature increases, the charge of the upper surface 26a of the first pyroelectric material 26 and the charge of the upper surface 27a of the second pyroelectric material 27 are offset, and the charge of the lower surface 26b of the first pyroelectric material 26 and the charge of the lower surface 27b of the second pyroelectric material 27 are offset.

Thus, the touch panel 2 according to the present embodiment can reduce the influence of pyroelectric noise due to temperature changes.

Figure 6:
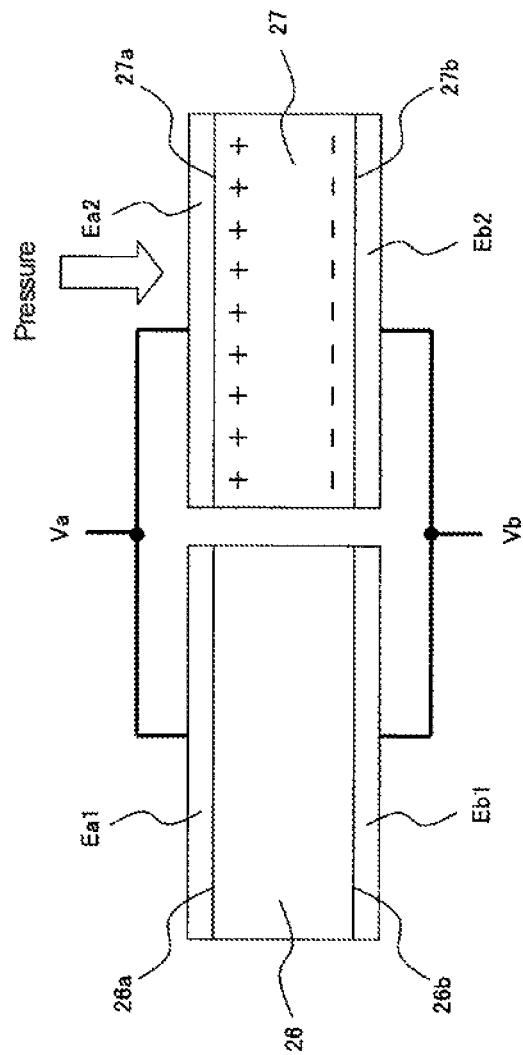
FIG. 6 shows the polarization state of the second pyroelectric material when the second pyroelectric material is pressed.

When a touch operation is performed on the touch panel 2, electromotive force is generated by the piezoelectric effect in the first pyroelectric material 26 or the second pyroelectric material 27 (the second pyroelectric material 27 in FIG. 6) corresponding to the touch position, as shown in FIG. 6. Thereby, the electric potential difference Va–Vb is input into the pressure detecting unit 5 as a voltage signal, and the pressure detecting unit 5 can detect press pressure applied to the touch panel 2 based on the voltage signal. Since the pyroelectric noise generated by the temperature change in the first pyroelectric material 26 and the second pyroelectric material 27 is reduced, as described above, the press pressure applied to the first pyroelectric material 26 or the second pyroelectric material 27 can be detected almost accurately from the electric potential difference Va–Vb. Thus, since the influence of pyroelectric noise can be reduced even when the environmental temperature changes, the touch panel 2 can accurately detect press pressure applied to the first pyroelectric material 26 or the second pyroelectric material 27.

Figure 7:
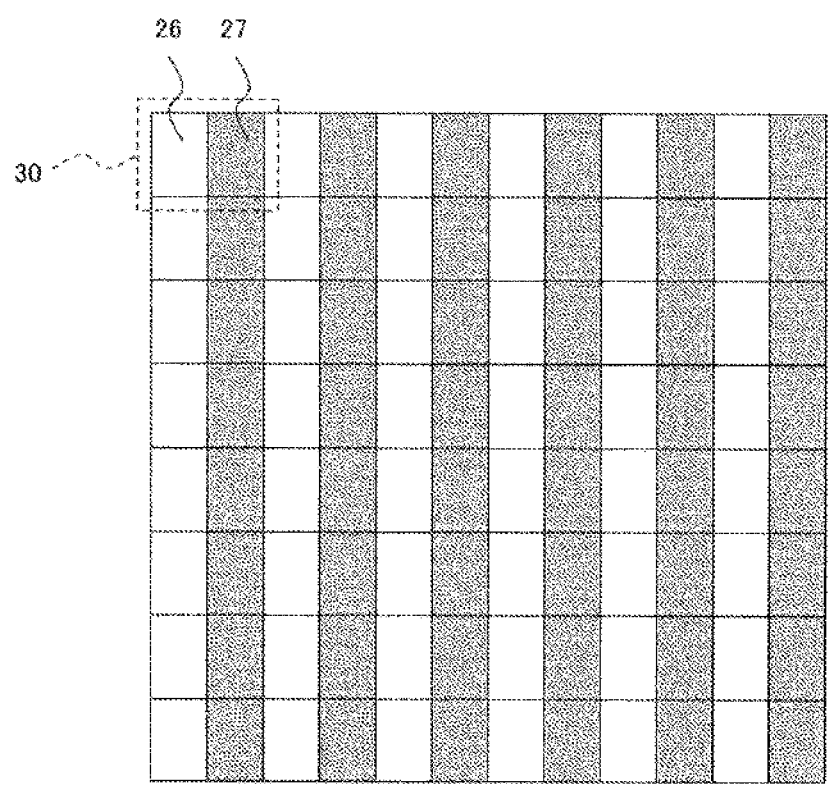
FIG. 7 shows a modification of Embodiment 1 of the present invention, and shows a structure in which a plurality of pyroelectric material pairs each comprising a pair of a first pyroelectric material and a second pyroelectric material are provided.

In the above embodiment, one first pyroelectric material 26 and one second pyroelectric material 27 are placed in one touch panel 2; however, one touch panel 2 may be configured to have a plurality of pyroelectric material pairs 30 each comprising a pair of a first pyroelectric material 26 and a second pyroelectric material 27 that are adjacent to each other, as shown in FIG. 7. In each pyroelectric material pair 30, the first pyroelectric material 26 and the second pyroelectric material 27 are connected as shown in FIG. 3. Although the number and size of the pyroelectric material pairs 30 are not particularly limited, the size of each pyroelectric material pair 30 is preferably equal to or smaller than the size of a human finger. FIG. 7 shows the second pyroelectric materials 27 in gray for convenience. A slight gap is provided between the first pyroelectric material 26 and the second pyroelectric material 27 in each pair.

According to the above structure, for example, when a heating element, such as a human finger, approaches or touches the touch panel 2 to thereby cause a temperature change in part of the touch panel 2, the influence of pyroelectric noise due to the temperature change can be cancelled in each pyroelectric material pair 30. Therefore, the resistance to pyroelectric noise can be further increased.

In the above embodiment, two pyroelectric materials are placed in parallel; however, two pyroelectric materials may be laminated. The following describes an embodiment in which two pyroelectric materials are laminated. Hereinafter, the same members that have been already described are assigned the same numbers, and a detailed explanation thereof is omitted.

Figure 8:
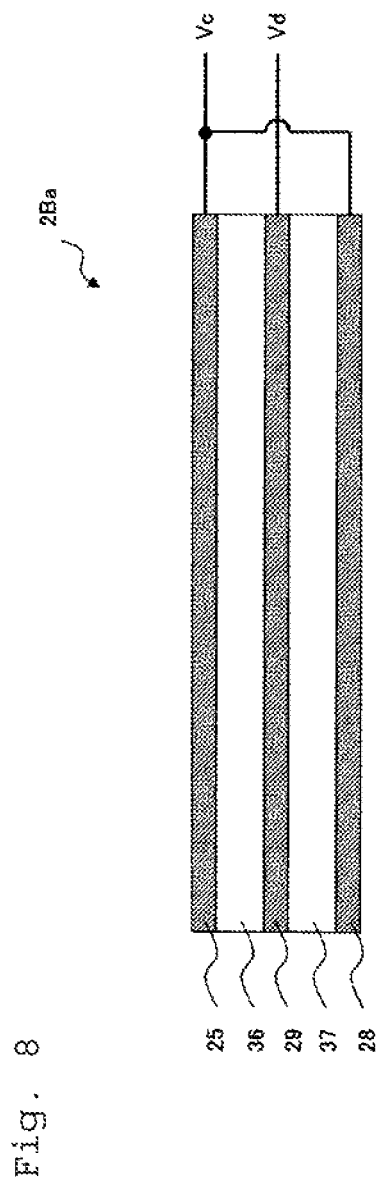
FIG. 8 is a cross-sectional view showing a modification of the piezoelectric element structure of the touch panel.

FIG. 8 is a cross-sectional view showing the structure of a piezoelectric element structure 2Ba according to a modification of the piezoelectric element structure 2B shown in FIG. 2. The piezoelectric element structure 2Ba comprises an upper conductive layer 25, a lower conductive layer 28, an intermediate conductive layer 29, a first pyroelectric material 36, and a second pyroelectric material 37. The upper conductive layer 25, the first pyroelectric material 36, the intermediate conductive layer 29, the second pyroelectric material 37, and the lower conductive layer 28 are sequentially laminated. The first pyroelectric material 36 and the second pyroelectric material 37 are transparent piezoelectric materials having piezoelectricity and pyroelectricity, and can be formed with the same material as that of the first pyroelectric material 26 and the second pyroelectric material 27 shown in FIG. 2. Because the first pyroelectric material 36 and the second pyroelectric material 37 have piezoelectricity, the touch panel 2 comprising the piezoelectric element structure 2Ba can detect press pressure applied to the first pyroelectric material 36 and the second pyroelectric material 37. Moreover, the intermediate conductive layer 29 can be an ITO electrode or a tin oxide electrode, as with the upper conductive layer 25 and the lower conductive layer 28. When the electric potential of the upper conductive layer 25 and the lower conductive layer 28 is regarded as Vc, and the electric potential of the intermediate conductive layer 29 is regarded as Vd, the piezoelectric element structure 2Ba outputs the difference between these electric potentials (Vc–Vd) as a voltage signal to the pressure detecting unit 5 shown in FIG. 1. The piezoelectric element structure 2Ba may be configured to output a current signal.

Unlike the piezoelectric element structure 2B shown in FIG. 2, the piezoelectric element structure 2Ba has a bimorph structure in which the first pyroelectric material 36 and the second pyroelectric material 37 are laminated via the intermediate conductive layer 29. The area of the first pyroelectric material 36 and the second pyroelectric material 37 is equal to the area of the upper conductive layer 25, the lower conductive layer 28, and the intermediate conductive layer 29. Similar to the piezoelectric element structure 2B shown in FIG. 2, the first pyroelectric material 36 and the second pyroelectric material 37 have almost the same pyroelectricity, and the amount of polarization charge generated by the same temperature change is almost the same between them.

Figure 9:
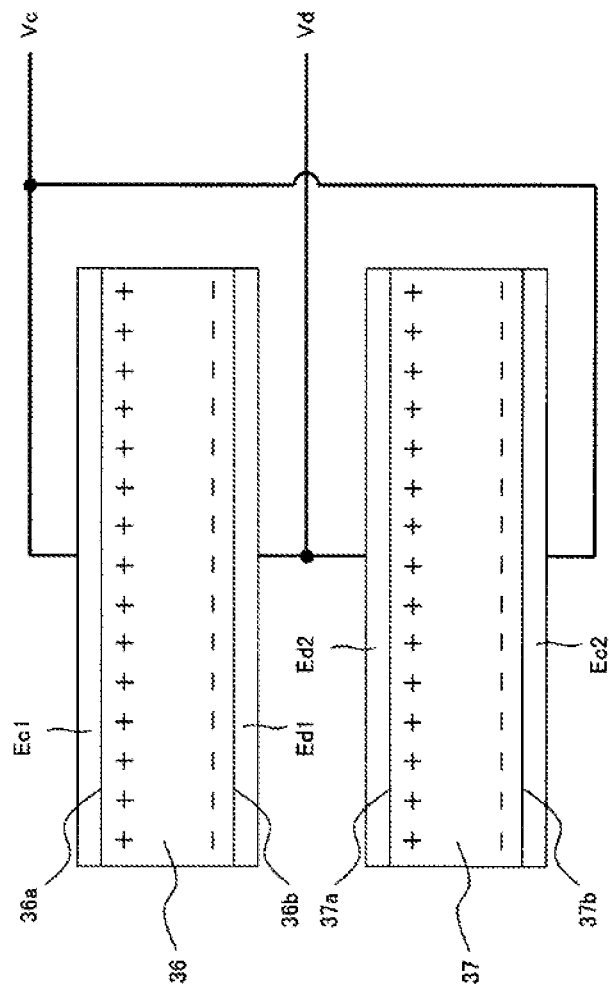
FIG. 9 shows the polarization state of the first pyroelectric material and the second pyroelectric material when the temperature increases.

By means of the upper conductive layer 25, the lower conductive layer 28, and the intermediate conductive layer 29, an electrode Ec1 disposed on the upper surface 36a (first surface) of the first pyroelectric material 36 and an electrode Ec2 disposed on the lower surface 37b (first surface) of the second pyroelectric material 37 are electrically connected to each other, and an electrode Ed1 disposed on the lower surface 36b (second surface) of the first pyroelectric material 36 and an electrode Ed2 disposed on the upper surface 37a (second surface) of the second pyroelectric material 37 are electrically connected to each other, as shown in FIG. 9. The electrode Ec1 and the electrode Ec2 correspond, respectively, to the upper conductive layer 25 and the lower conductive layer 28 shown in FIG. 8. Moreover, the electrode Ed1 corresponds to a portion of the intermediate conductive layer 29 on the side of the first pyroelectric material 36, and the electrode Ed2 corresponds to a portion of the intermediate conductive layer 29 on the side of the second pyroelectric material 37. Furthermore, as shown in FIGS. 9 and 10, the first pyroelectric material 36 and the second pyroelectric material 37 are placed so that the upper surface 36a (first surface) of the first pyroelectric material 36 and the upper surface 37a (second surface) of the second pyroelectric material 37 are surfaces on which a positive charge (first polar charge) is generated when the temperature increases, and a negative charge (second polar charge) is generated when the temperature decreases; and so that the lower surface 36b (second surface) of the first pyroelectric material 36 and the lower surface 37b (first surface) of the second pyroelectric material 37 are surfaces on which a negative charge is generated when the temperature increases, and a positive charge is generated when the temperature decreases.

When the temperature increases, a positive charge is generated on the upper surface 36a of the first pyroelectric material 36 and the upper surface 37a of the second pyroelectric material 37, and a negative charge is generated on the lower surface 36b of the first pyroelectric material 36 and the lower surface 37b of the second pyroelectric material 37, as shown in FIG. 9. Since the amount of polarization charge generated by the same temperature change is almost the same between the first pyroelectric material 36 and the second pyroelectric material 37, as described above, the charge of the upper surface 36a of the first pyroelectric material 36 (i.e., the charge of the electrode Ec1) and the charge of the lower surface 37b of the second pyroelectric material 37 (i.e., the charge of the electrode Ec2) are offset, and the charge of the lower surface 36b of the first pyroelectric material 36 (i.e., the charge of the electrode Ed1) and the charge of the upper surface 37a of the second pyroelectric material 37 (i.e., the charge of the electrode Ed2) are offset. Therefore, pyroelectric noise detected by the pressure detecting unit 5 can be reduced.

Figure 10:
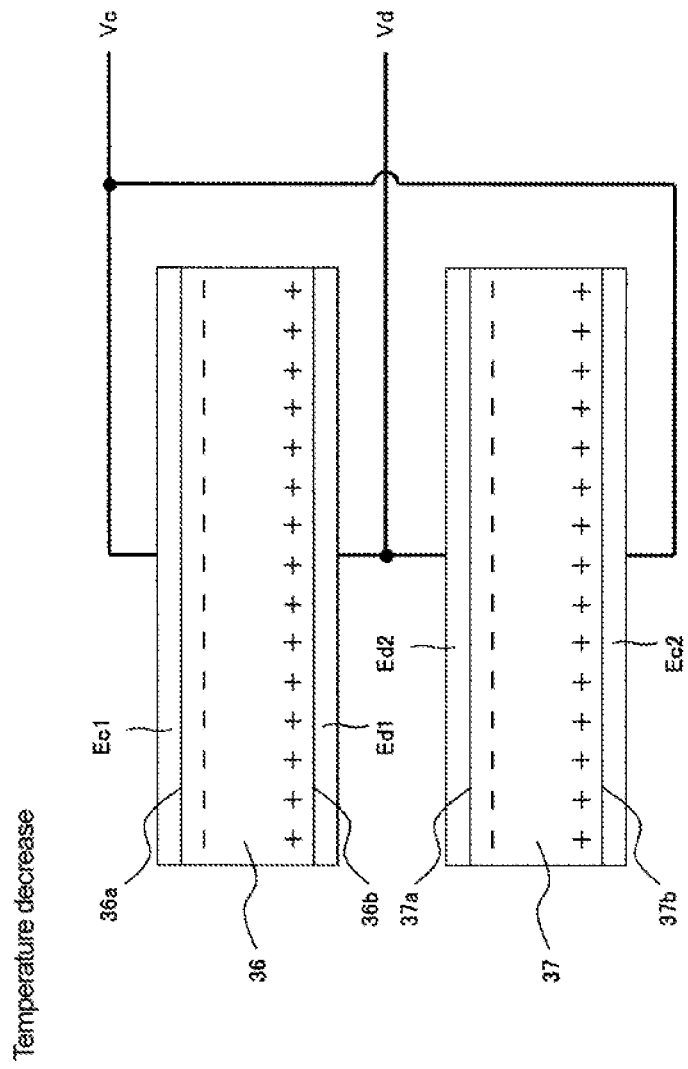
FIG. 10 shows the polarization state of the first pyroelectric material and the second pyroelectric material when the temperature decreases.

Moreover, when the temperature decreases, a negative charge is generated on the upper surface 36a of the first pyroelectric material 36 and the upper surface 37a of the second pyroelectric material 37, and a positive charge is generated on the lower surface 36b of the first pyroelectric material 36 and the lower surface 37b of the second pyroelectric material 37, as shown in FIG. 10. Accordingly, as with when the temperature increases, the charge of the upper surface 36a of the first pyroelectric material 36 and the charge of the lower surface 37b of the second pyroelectric material 37 are offset, and the charge of the lower surface 36b of the first pyroelectric material 36 and the charge of the upper surface 37a of the second pyroelectric material 37 are offset.

As described above, the piezoelectric element structure 2Ba is configured to be able to cancel pyroelectric noise generated by the pyroelectric effect in the first pyroelectric material 36 and the second pyroelectric material 37 when the environmental temperature changes. Therefore, the touch panel 2 comprising the piezoelectric element structure 2Ba can reduce the influence of pyroelectric noise due to temperature changes.

Figure 11:
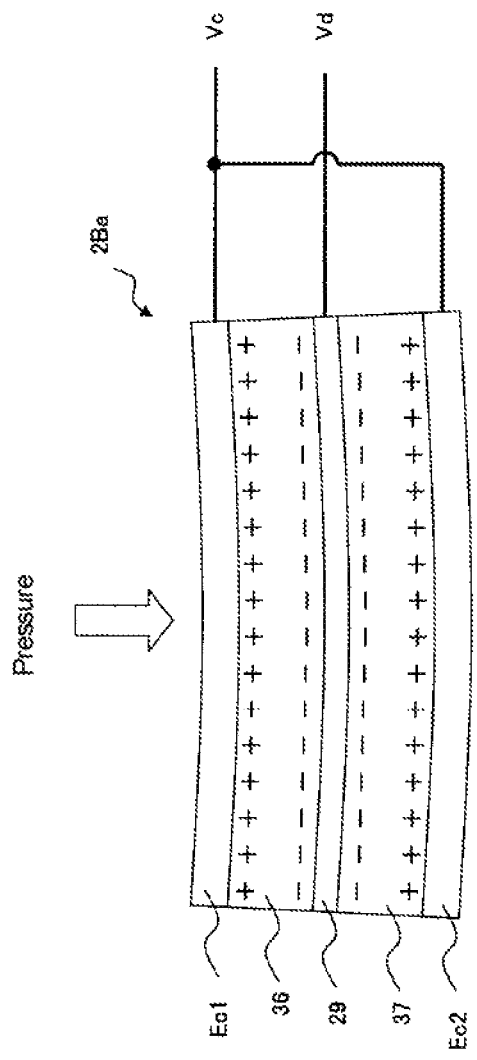
FIG. 11 shows the polarization state of the first pyroelectric material and the second pyroelectric material when they are pressed.

When a touch operation is performed on the touch panel 2, compressive force acts on the first pyroelectric material 36, and tensile force acts on the second pyroelectric material 37, as shown in FIG. 11. Therefore, a positive charge is generated on the upper surface 36a of the first pyroelectric material 36 and the lower surface 27b of the second pyroelectric material 37, and a negative charge is generated on the lower surface 36b of the first pyroelectric material 36 and the upper surface 37a of the second pyroelectric material 37. Thereby, an electric potential difference is generated between the electric potential Vc and the electric potential Vd, and the electric potential difference Vc−Vd is input into the pressure detecting unit 5 as a voltage signal. The pressure detecting unit 5 can detect press pressure applied to the touch panel 2 based on the voltage signal.

Since the pyroelectric noise generated by the temperature change in the first pyroelectric material 36 and the second pyroelectric material 37 is reduced, as described above, the press pressure applied to the first pyroelectric material 36 and the second pyroelectric material 37 can be detected almost accurately from the electric potential difference Vc−Vd. Thus, since the influence of pyroelectric noise can be reduced even when the environmental temperature changes, the touch panel 2 can accurately detect press pressure applied to the first pyroelectric material 36 and the second pyroelectric material 37.

As described above, the touch panel according to the present embodiment can reduce the influence of pyroelectric noise due to temperature changes because it is configured to be able to cancel pyroelectric noise generated by the first pyroelectric material and second pyroelectric material.

In the piezoelectric element structure 2B shown in FIG. 2, the electrode Ea1 and electrode Ea2 shown in FIGS. 3, 5, and 6 form one conductive layer (upper conductive layer 25), and the electrode Eb1 and the electrode Eb2 form one conductive layer (lower conductive layer 28); however, the electrodes Ea1, Ea2, Eb1, and Eb2 may be formed into individual conductive layers. Similarly, in the piezoelectric element structure 2Ba shown in FIG. 8, the electrode Ed1 and the electrode Ed2 shown in FIGS. 9 and 10 form one conductive layer (intermediate conductive layer 29); however, the electrodes Ed1 and Ed2 may be formed into individual conductive layers.

In this embodiment, it is preferable that the amount of polarization charge generated by the same temperature change is almost the same between the first pyroelectric material and the second pyroelectric material. Thereby, when the temperature changes, the charge generated in the first surface of the first pyroelectric material and the charge generated in the first surface of the second pyroelectric material are almost completely offset, and the charge generated in the second surface of the first pyroelectric material and the charge generated in the second surface of the second pyroelectric material are almost completely offset. Therefore, the electric potential difference between the first surface of the first pyroelectric material and the first surface of the second pyroelectric material, and the second surface of the first pyroelectric material and the second surface of the second pyroelectric material can be almost eliminated. Consequently, pyroelectric noise can be almost completely cancelled.

In practical use, the amount of polarization charge generated by the same temperature change may differ slightly between the first pyroelectric material and the second pyroelectric material. In this case, when the temperature changes, the positive charge generated in the first surface of the first pyroelectric material and the negative charge generated in the first surface of the second pyroelectric material are partially offset, and the negative charge generated in the second surface of the first pyroelectric material and the positive charge generated in the second surface of the second pyroelectric material are partially offset; therefore, the electric potential difference (Va–Vb or Vc–Vd) between the first surface of the first pyroelectric material and the first surface of the second pyroelectric material, and the second surface of the first pyroelectric material and the second surface of the second pyroelectric material is smaller than the electric potential difference between both sides of the first and second pyroelectric materials. Accordingly, although the pyroelectric noise is not completely cancelled, the influence of pyroelectric noise can be more suppressed, compared with the conventional structure. The first and second pyroelectric materials may have different shapes.

It is also preferable that the first and second pyroelectric materials have an equivalent level of piezoelectric constant d33. Further, the equivalent level of piezoelectric constant d33 of the first and second pyroelectric materials is preferably lower because electrical signals by pyroelectricity can be reduced more efficiently. Specifically, the piezoelectric constant d33 of the first and second pyroelectric materials is preferably 25 pC/N or less, more preferably 20 pC/N or less, and even more preferably 8 pC/N or less.

Furthermore, in order to sufficiently obtain electrical signals by piezoelectricity (i.e., piezoelectric signals) while canceling pyroelectric noise (in other words, in order not to cancel piezoelectricity), it is preferable that the film thickness of the first pyroelectric material is different from that of the second pyroelectric material. Specifically, higher piezoelectric signals can be obtained by setting the ratio of the film thickness of the first pyroelectric material and that of the second pyroelectric material to preferably 1.1 times or more, and more preferably 1.5 times or more.

In the touch panel 2 of the present invention, the detection of press pressure by the pressure detecting unit 5 is performed by reading a voltage value or a current value through a detection circuit. This varies whether the detection electric circuit is a voltage mode or a charge mode. The detection can be performed by:

(1) directly reading the voltage or charge generated from the film, or (2) reading the charge or voltage after amplification in the detection circuit.

When noise causes a problem during the detection, the following means can be taken:

(1) electromagnetic waves causing noise are shielded to remove the noise; and/or (2) the charge or voltage equal to or lower than a predetermined level is cut off, because noise is generally smaller than signals.

In the case of the touch panel 2 of the present invention, pyroelectric signals are added to a noise source in some cases. To cut the signals, the cut-off setting (2) mentioned above can be used. In order to further positively cancel the pyroelectric signals, the following means can be taken:

(1) employing a bimorph structure in which two films having opposite poling directions are opposite to each other as the first pyroelectric material and the second pyroelectric material;

(2) using films having a low piezoelectric constant d33 as the first pyroelectric material and the second pyroelectric material, thereby reducing the pyroelectric signals; and/or (3) incorporating a pyroelectric element that outputs a pyroelectric signal equivalent to the pyroelectric signals of the first pyroelectric material and the second pyroelectric material, thereby cancelling the pyroelectric signals.

The detection can be performed by reading differential signals or by reading integral signals. In the touch panel 2 of the present invention, piezoelectric signals and pyroelectric signals are generated as differential signals to pressure or heat; however, in order to accurately take the gradation for pressure, it is preferable to read them as integral signals. When the signals are read as integral signals, the time of integration can be freely determined, but is preferably set to 1 µs to 10 min, and more preferably 1 ms to 1 min.

Embodiment 2

The above embodiment describes a structure in which electrodes disposed in two pyroelectric materials on their surfaces on which different polar charges are generated when the temperature increases are electrically connected to each other. The following describes a structure that is configured such that voltage signals are output from electrodes disposed in two pyroelectric materials on their surfaces on which the same polar charge is generated when the temperature increases, thereby cancelling pyroelectric noise. The same members that have been already described in Embodiment 1 are assigned the same numbers, and a detailed explanation thereof is omitted.

Figure 12:
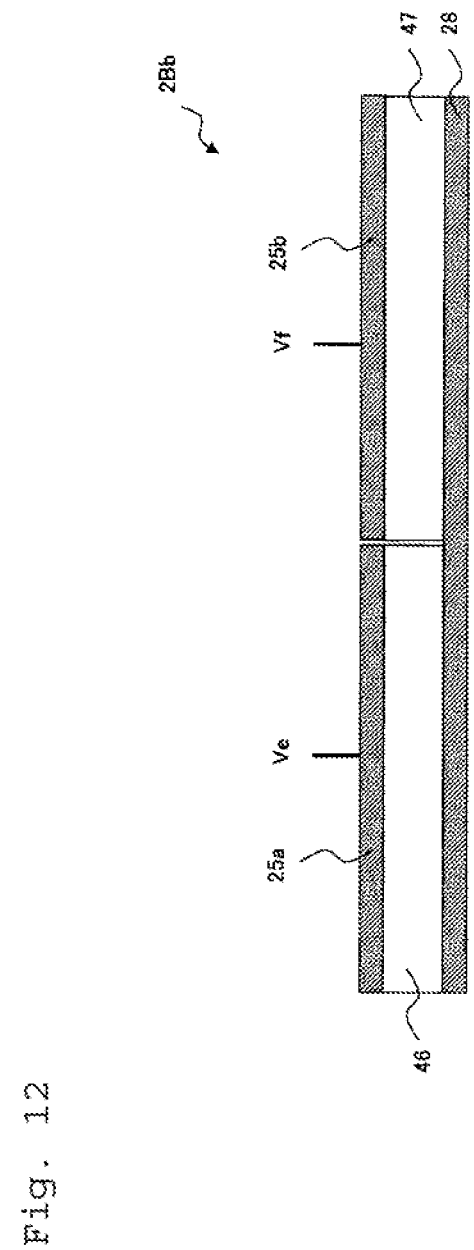
FIG. 12 is a cross-sectional view showing the structure of a piezoelectric element structure according to Embodiment 2.

FIG. 12 is a cross-sectional view showing the structure of a piezoelectric element structure 2Bb according to Embodiment 2. The piezoelectric element structure 2Bb is a modification of the piezoelectric element structure 2B of the touch panel 2 shown in FIG. 2. The piezoelectric element structure 2Ba comprises two upper conductive layers 25a and 25b, a lower conductive layer 28, a first pyroelectric material 46, and a second pyroelectric material 47. The first pyroelectric material 46 and the second pyroelectric material 47 are laminated in parallel on the lower conductive layer 28. The upper conductive layer 25a is laminated on the upper surface 46a (first surface) of the first pyroelectric material 46, and the upper conductive layer 25b is laminated on the upper surface 47a (first surface) of the second pyroelectric material 47. The first pyroelectric material 46 and the second pyroelectric material 47 are transparent piezoelectric materials having piezoelectricity and pyroelectricity, and can be formed with the same material as that of the first pyroelectric material 26 and the second pyroelectric material 27 shown in FIG. 2. Because the first pyroelectric material 46 and the second pyroelectric material 47 have piezoelectricity, the touch panel 2 comprising the piezoelectric element structure 2Bb can detect press pressure applied to the first pyroelectric material 46 or the second pyroelectric material 47. When the electric potential of the upper conductive layer 25a, i.e., the electric potential of the upper surface 46a of the first pyroelectric material 46, is regarded as Ve, and the electric potential of the upper conductive layer 25b, i.e., the electric potential of the upper surface 47a of the second pyroelectric material 47, is regarded as Vf, the piezoelectric element structure 2Bb outputs the difference between these electric potentials (Ve–Vf) as a voltage signal to the pressure detecting unit 5 shown in FIG. 1.

Figures 13A, 13B:
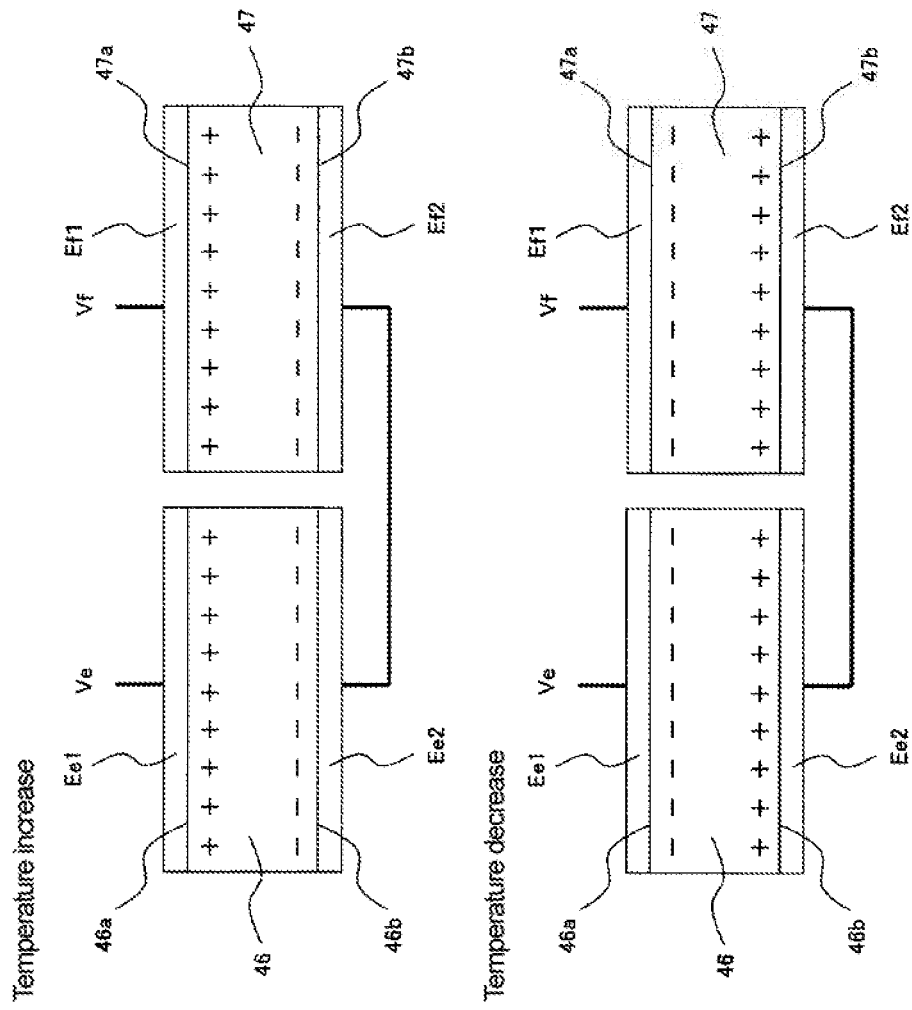
FIGS. 13 (a) and (b) show the polarization state of the first pyroelectric material and the second pyroelectric material when the temperature increases and when the temperature decreases, respectively.

In other words, as shown in FIGS. 13 (*a*) and (*b*), the touch panel 2 outputs voltage signals from an electrode Ee1 disposed on the upper surface 46a (first surface) of the first pyroelectric material 46, and an electrode Ef1 disposed on the upper surface 47a (first surface) of the second pyroelectric material 47. The electrodes Ee1 and Ef1 correspond, respectively, to the upper conductive layers 25a and 25b shown in FIG. 12. The piezoelectric element structure 2Bb may be configured to output a current signal.

Moreover, an electrode Ee2 disposed on the lower surface 46b (second surface) of the first pyroelectric material 46 and an electrode Ef2 disposed on the lower surface 47b (second surface) of the second pyroelectric material 47 are electrically connected to each other through the lower conductive layer 28. The electrode Ee2 corresponds to a portion of the lower conductive layer 28 below the first pyroelectric material 46, and the electrode Ef2 corresponds to a portion of the lower conductive layer 28 below the second pyroelectric material 47.

Furthermore, as shown in FIGS. 13 (a) and (b), the first pyroelectric material 46 and the second pyroelectric material 47 are placed so that the upper surface 46a (first surface) of the first pyroelectric material 46 and the upper surface 47a (first surface) of the second pyroelectric material 47 are surfaces on which a positive charge (first polar charge) is generated when the temperature increases, and a negative charge (second polar charge) is generated when the temperature decreases; and so that the lower surface 46b (second surface) of the first pyroelectric material 46 and the lower surface 47b (second surface) of the second pyroelectric material 47 are surfaces on which a negative charge is generated when the temperature increases, and a positive charge is generated when the temperature decreases. Moreover, the lower surface 46b of the first pyroelectric material 46 and the lower surface 47b of the second pyroelectric material 47 are electrically connected to each other.

When the temperature increases, a positive charge is generated on the upper surface 46a of the first pyroelectric material 46 and the upper surface 47a of the second pyroelectric material 47, and a negative charge is generated on the lower surface 46b of the first pyroelectric material 46 and the lower surface 47b of the second pyroelectric material 47, as shown in FIG. 13 (a). The amount of polarization charge generated by the same temperature change is almost the same between the first pyroelectric material 46 and the second pyroelectric material 47. Accordingly, the electric potential of the upper surface 46a of the first pyroelectric material 46 (i.e., the electric potential Ve of the electrode Ee1) and the electric potential of the lower surface 47b of the second pyroelectric material 47 (i.e., the electric potential Vf of the electrode Ef1) are almost equal. Therefore, pyroelectric noise detected by the pressure detecting unit 5 can be reduced.

Moreover, when the temperature decreases, a negative charge is generated on the upper surface 46a of the first pyroelectric material 46 and the upper surface 47a of the second pyroelectric material 47, and a positive charge is generated on the lower surface 46b of the first pyroelectric material 46 and the lower surface 47b of the second pyroelectric material 47, as shown in FIG. 13 (b). In this case, the electric potential Ve of the electrode Ee1 and the electric potential Vf of the electrode Ef1 are also almost equal, as with when the temperature increases. Therefore, pyroelectric noise detected by the pressure detecting unit 5 can be reduced.

Figure 14:
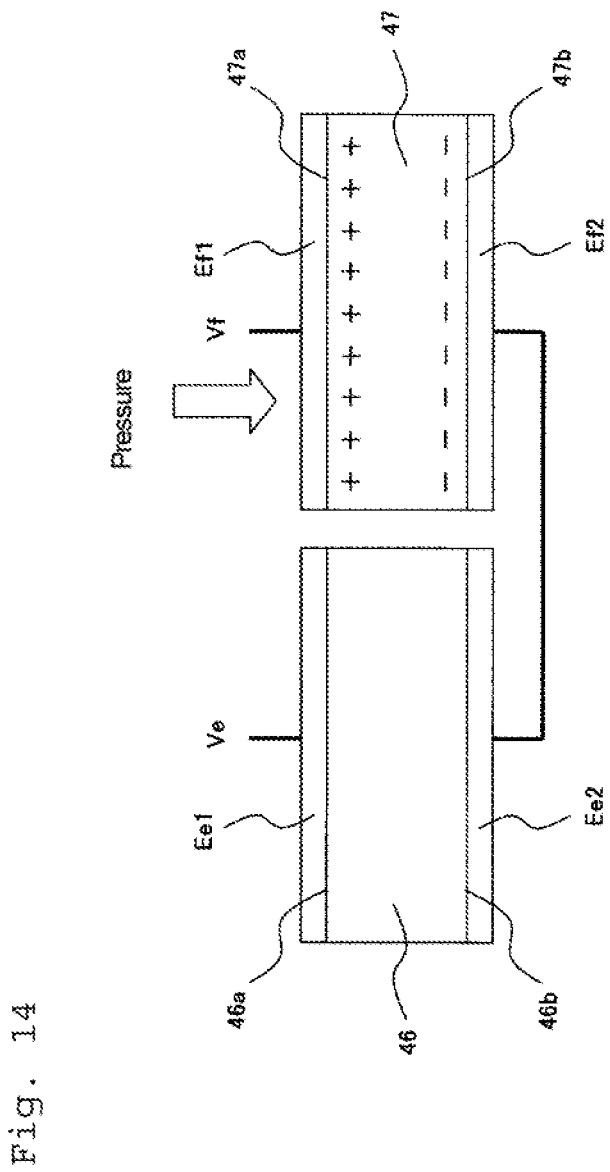
FIG. 14 shows the polarization state of the second pyroelectric material when the second pyroelectric material is pressed.

When a touch operation is performed on the touch panel 2, electromotive force is generated by the piezoelectric effect in the first pyroelectric material 46 or the second pyroelectric material 47 (the second pyroelectric material 47 in FIG. 14) corresponding to the touch position, as shown in FIG. 14. Thereby, the electric potential difference Ve–Vf is input into the pressure detecting unit 5 as a voltage signal, and the pressure detecting unit 5 can detect press pressure applied to the touch panel 2 based on the voltage signal. Since the pyroelectric noise generated by the temperature change in the first pyroelectric material 46 and the second pyroelectric material 47 is reduced, as described above, the press pressure applied to the first pyroelectric material 46 or the second pyroelectric material 47 can be detected almost accurately from the electric potential difference Ve–Vf. Thus, since the influence of pyroelectric noise can be reduced even when the environmental temperature changes, the touch panel 2 can accurately detect press pressure applied to the first pyroelectric material 46 or the second pyroelectric material 47.

In the piezoelectric element structure 2Bb, two pyroelectric materials are placed in parallel; however, two pyroelectric materials may be laminated.

Figure 15:
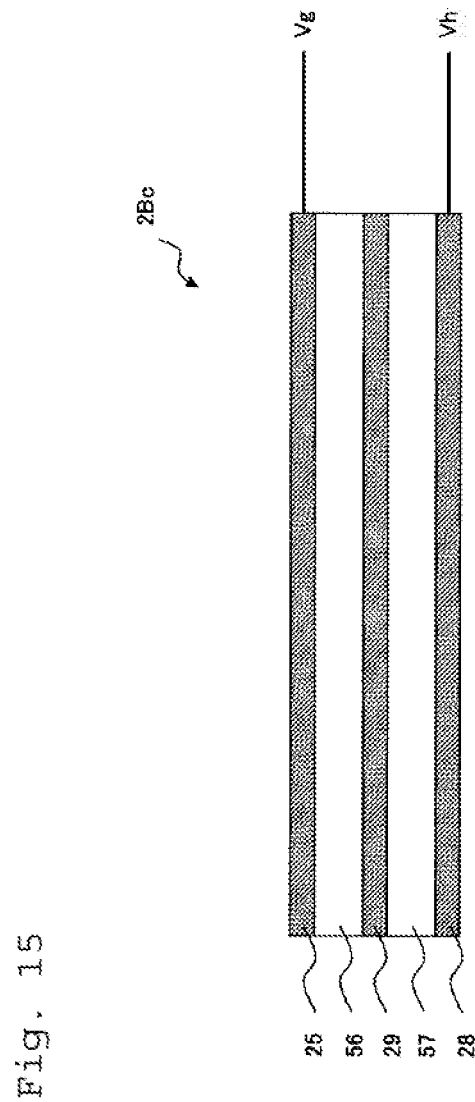
FIG. 15 is a cross-sectional view showing the structure of a piezoelectric element structure according to a modification of Embodiment 2.
Figure 16:
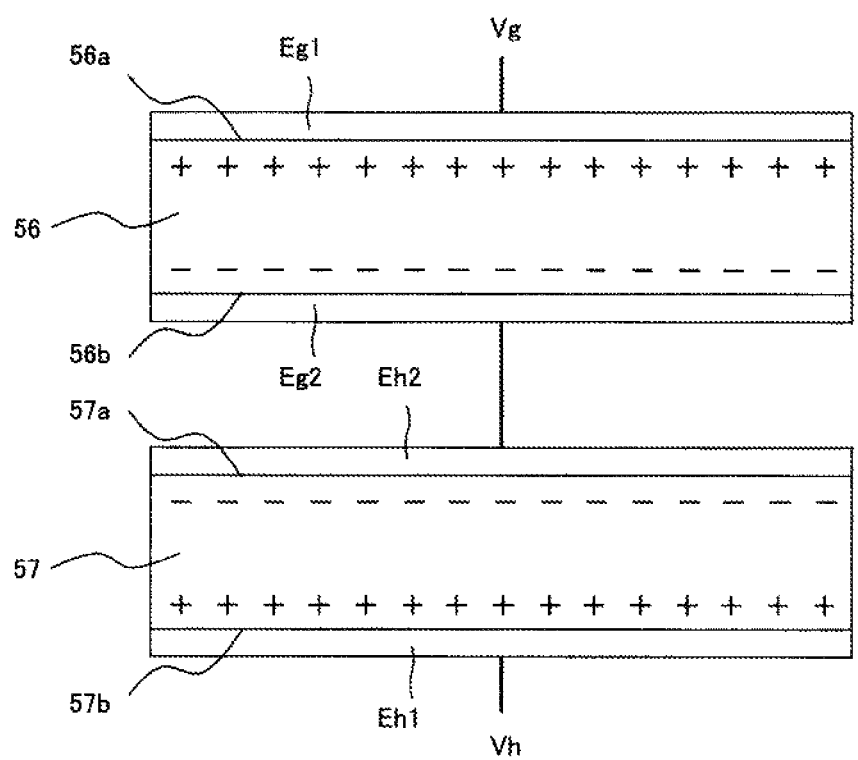
FIG. 16 shows the polarization state of the first pyroelectric material and the second pyroelectric material when the temperature increases.

FIG. 15 is a cross-sectional view showing the structure of a piezoelectric element structure 2Bc according to a modification of Embodiment 2. The piezoelectric element structure 2Bc is a modification of the piezoelectric element structure 2B of the touch panel 2 shown in FIG. 2. The piezoelectric element structure 2Bc comprises an upper conductive layer 25, a lower conductive layer 28, an intermediate conductive layer 29, a first pyroelectric material 56, and a second pyroelectric material 57. The upper conductive layer 25, the first pyroelectric material 56, the intermediate conductive layer 29, the second pyroelectric material 57, and the lower conductive layer 28 are sequentially laminated. The first pyroelectric material 56 and the second pyroelectric material 57 are transparent piezoelectric materials having piezoelectricity and pyroelectricity, and can be formed with the same material as that of the first pyroelectric material 26 and the second pyroelectric material 27 shown in FIG. 2. Because the first pyroelectric material 56 and the second pyroelectric material 57 have piezoelectricity, the touch panel 2 comprising the piezoelectric element structure 2Bc can detect press pressure applied to the first pyroelectric material 56 and/or the second pyroelectric material 57. When the electric potential of the upper conductive layer 25, i.e., the electric potential of the upper surface 56a (first surface) of the first pyroelectric material 56, is regarded as Vg, and the electric potential of the lower conductive layer 28, i.e., the electric potential of the lower surface 57b (first surface) of the second pyroelectric material 57, is regarded as Vh, the piezoelectric element structure 2Bc outputs the difference between these electric potentials (Vg–Vh) as a voltage signal to the pressure detecting unit 5 shown in FIG. 1. In other words, as shown in FIG. 16, the touch panel 2 outputs voltage signals from an electrode Eg1 disposed on the upper surface 56a (first surface) of the first pyroelectric material 56, and an electrode Eh1 disposed on the lower surface 57b (first surface) of the second pyroelectric material 57. The electrode Eg1 and the electrode Eh1 correspond, respectively, to the upper conductive layer 25 and the lower conductive layer 28 shown in FIG. 15. The piezoelectric element structure 2Bc may be configured to output a current signal.

Moreover, an electrode Eg2 disposed on the lower surface 56b (second surface) of the first pyroelectric material 56 and an electrode Eh2 disposed on the upper surface 57a (second surface) of the second pyroelectric material 57 are electrically connected to each other through the intermediate conductive layer 29. The electrode Eg2 corresponds to a portion of the intermediate conductive layer 29 on the side of the first pyroelectric material 56, and the electrode Eh2 corresponds to a portion of the intermediate conductive layer 29 on the side of the second pyroelectric material 57.

Figure 17:
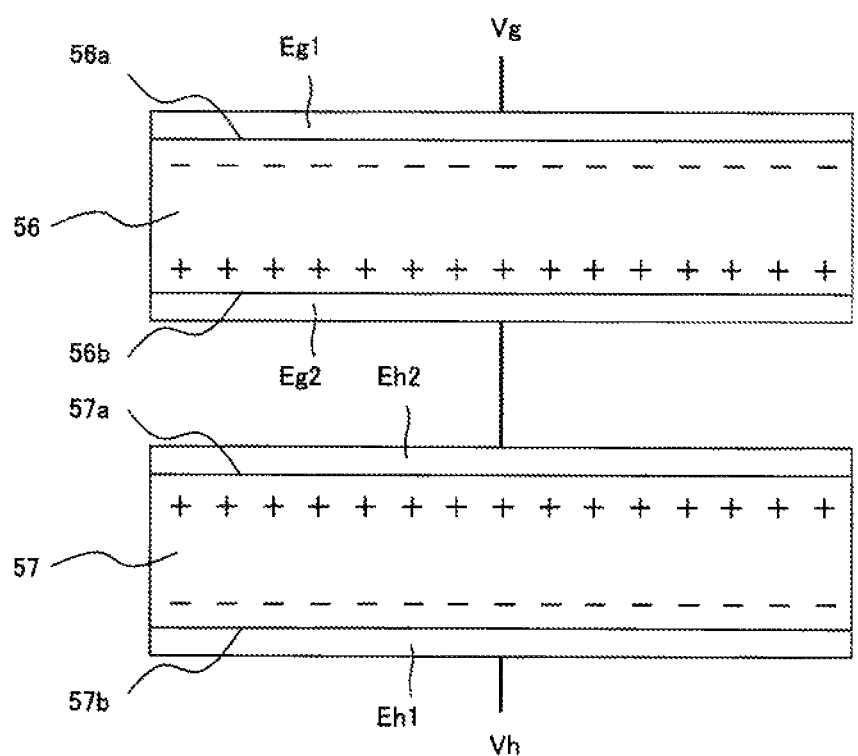
FIG. 17 shows the polarization state of the first pyroelectric material and the second pyroelectric material when the temperature decreases.

Furthermore, as shown in FIGS. 16 and 17, the first pyroelectric material 56 and the second pyroelectric material 57 are placed so that the upper surface 56a (first surface) of the first pyroelectric material 56 and the lower surface 57b (first surface) of the second pyroelectric material 57 are surfaces on which a positive charge (first polar charge) is generated when the temperature increases, and a negative charge (second polar charge) is generated when the temperature decreases; and so that the lower surface 56b (second surface) of the first pyroelectric material 56 and the upper surface 57a (second surface) of the second pyroelectric material 57 are surfaces on which a negative charge (second polar charge) is generated when the temperature increases, and a positive charge is generated when the temperature decreases. Moreover, the electrode disposed on the lower surface 56b of the first pyroelectric material 56 and the electrode disposed on the upper surface 57a of the second pyroelectric material 57 are electrically connected to each other.

When the temperature decreases, a positive charge is generated on the upper surface 56a of the first pyroelectric material 56 and the lower surface 57b of the second pyroelectric material 57, and a negative charge is generated on the lower surface 56b of the first pyroelectric material 56 and the upper surface 57a of the second pyroelectric material 57, as shown in FIG. 16. The amount of polarization charge generated by the same temperature change is almost the same between the first pyroelectric material 56 and the second pyroelectric material 57. Accordingly, the electric potential difference between the upper surface 56a and lower surface 56b of the first pyroelectric material 56 is almost equal to the electric potential difference between the upper surface 57a and lower surface 57b of the second pyroelectric material 57. Moreover, because the electrode Eg2 and the electrode Eh2 are electrically connected to each other, the electric potential of the lower surface 56b of the first pyroelectric material 56 is equal to the electric potential of the upper surface 57a of the second pyroelectric material 57; thus, the electric potential of the upper surface 56a of the first pyroelectric material 56 (i.e., the electric potential Vg of the electrode Eg1) and the electric potential of the lower surface 57b of the second pyroelectric material 57 (i.e., the electric potential Vh of the electrode Eh1) are almost equal. Therefore, pyroelectric noise detected by the pressure detecting unit 5 can be reduced.

Moreover, when the temperature decreases, a negative charge is generated on the upper surface 56a of the first pyroelectric material 56 and the lower surface 57b of the second pyroelectric material 57, and a positive charge is generated on the lower surface 56b of the first pyroelectric material 56 and the upper surface 57a of the second pyroelectric material 57, as shown in FIG. 17. In this case, the electric potential Vg of the electrode Eg1 and the electric potential Vh of the electrode Eh1 are also almost equal, as with when the temperature increases. Therefore, pyroelectric noise detected by the pressure detecting unit 5 can be reduced.

Figure 18:
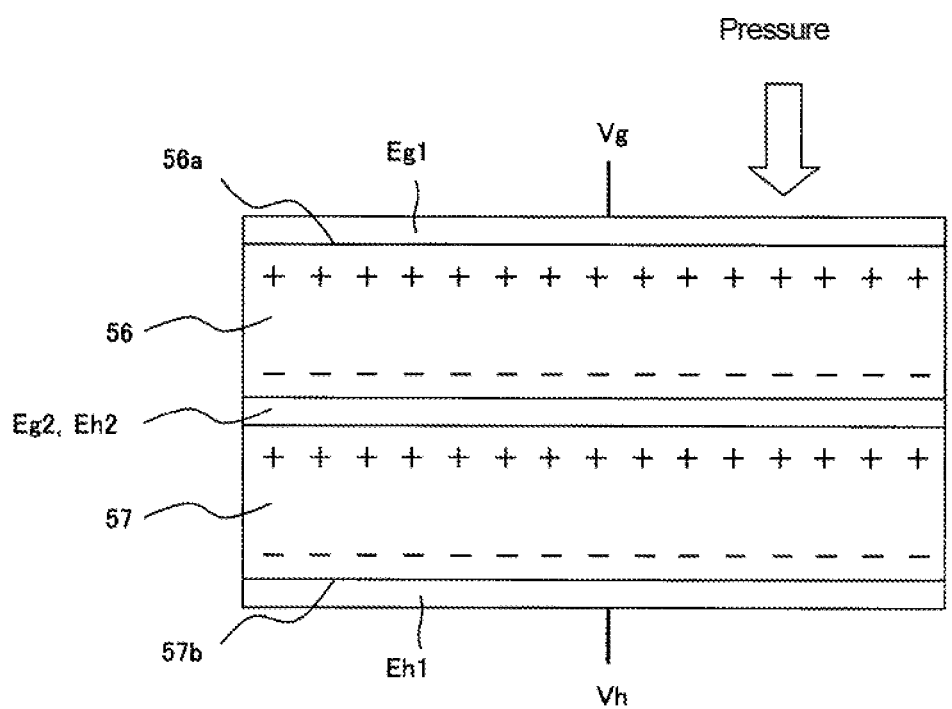
FIG. 18 shows the polarization state of the first pyroelectric material and the second pyroelectric material when they are pressed.

When a touch operation is performed on the touch panel 2, the first pyroelectric material 56 and the second pyroelectric material 57 are polarized in the same direction, and an electric potential difference is generated between the electrode Eg1 and the electrode Eh1, as shown in FIG. 18. Thereby, the electric potential difference Vg−Vh is input into the pressure detecting unit 5 as a voltage signal, and pressure detecting unit 5 can detect press pressure applied to the touch panel 2 based on the voltage signal. Since the pyroelectric noise generated by the temperature change in the first pyroelectric material 56 and the second pyroelectric material 57 is reduced, as described above, the electric potential difference Vg−Vh mainly corresponds to the press pressure applied to the first pyroelectric material 56 and the second pyroelectric material 57. Thus, since the influence of pyroelectric noise can be reduced even when the environmental temperature changes, the touch panel 2 can accurately detect press pressure applied to the first pyroelectric material 56 and the second pyroelectric material 57.

In this embodiment, it is preferable that the amount of polarization charge generated by the same temperature change is the same between the first pyroelectric material and the second pyroelectric material. Thereby, when the temperature changes, the pyroelectric voltage of the first pyroelectric material and the pyroelectric voltage of the second pyroelectric material are almost completely offset. Therefore, the electric potential difference between the first surface of the first pyroelectric material and the first surface of the second pyroelectric material can be almost eliminated. Consequently, pyroelectric noise can be almost completely cancelled.

In practical use, the amount of polarization charge generated by the same temperature change may differ slightly between the first pyroelectric material and the second pyroelectric material. In this case, when the temperature changes, the pyroelectric voltage of the first pyroelectric material and the pyroelectric voltage of the second pyroelectric material are partially offset; therefore, the electric potential difference (Ve−Vf or Vg−Vh) between the first surface of the first pyroelectric material and the first surface of the second pyroelectric material is smaller than the electric potential difference between both sides of the first and second pyroelectric materials. Accordingly, although the pyroelectric noise is not completely cancelled, the influence of pyroelectric noise can be more suppressed, compared with the conventional structure. The first and second pyroelectric materials may have different shapes.

It is also preferable that the first and second pyroelectric materials have an equivalent level of piezoelectric constant d33. Further, the equivalent level of piezoelectric constant d33 of the first and second pyroelectric materials is preferably lower because electrical signals by pyroelectricity can be reduced more efficiently. Specifically, the piezoelectric constant d33 of the first and second pyroelectric materials is preferably 25 pC/N or less, more preferably 20 pC/N or less, and even more preferably 8 pC/N or less.

Furthermore, in order to sufficiently obtain piezoelectric signals while canceling pyroelectric noise, it is preferable that the film thickness of the first pyroelectric material is different from that of the second pyroelectric material. Specifically, higher piezoelectric signals can obtained by setting the ratio of the film thickness of the first pyroelectric material and that of the second pyroelectric material to preferably 1.1 times or more, and more preferably 1.5 times or more.

Embodiment 3

In Embodiments 1 and 2, a pyroelectric material and an electrode (conductive layer) are directly laminated. The following embodiment describes a structure in which a pressure-sensitive adhesive layer or an adhesive layer is provided between a pyroelectric material and an electrode. The same members that have been already described in Embodiments 1 and 2 are assigned the same numbers, and a detailed explanation thereof is omitted.

Figure 19:
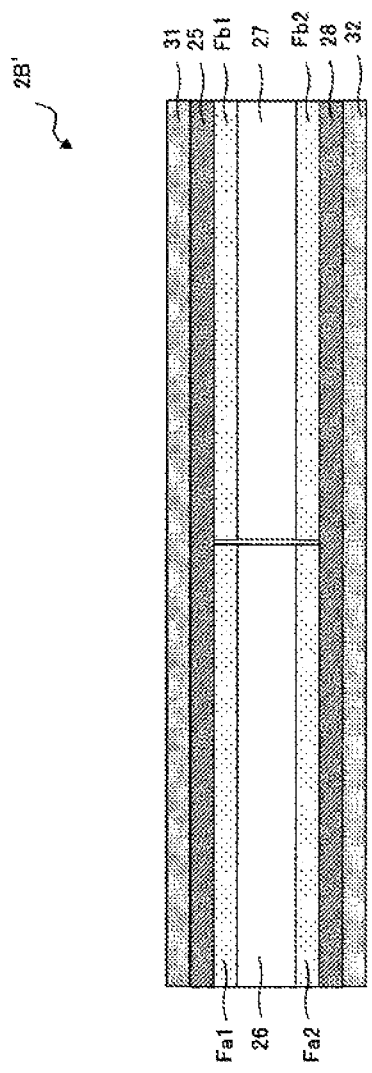
FIG. 19 is a cross-sectional view showing the structure of a piezoelectric element structure according to Embodiment 3.

FIG. 19 is a cross-sectional view showing the structure of a piezoelectric element structure 2B' according to Embodiment 3. The piezoelectric element structure 2B' is another modification of the piezoelectric element structure 2B of the touch panel 2 shown in FIG. 2. Similar to the piezoelectric element structure 2Ba, the piezoelectric element structure 2B' comprises an upper conductive layer 25, a first pyroelectric material 26, a second pyroelectric material 27, and a lower conductive layer 28. Further, the piezoelectric element structure 2B' comprises four pressure-sensitive adhesive layers or adhesive layers Fa1, Fa2, Fb1, and Fb2, and two protective layers 31 and 32. The pressure-sensitive adhesive layers or adhesive layers Fa1, Fa2, Fb1, and Fb2 are provided, respectively, between the upper conductive layer 25 and the first pyroelectric material 26, between the lower conductive layer 28 and the first pyroelectric material 26, between the upper conductive layer 25 and the second pyroelectric material 27, and between the lower conductive layer 28 and the second pyroelectric material 27. In other words, the pressure-sensitive adhesive layers or adhesive layers Fa1, Fa2, Fb1, and Fb2 are provided, respectively, between the first surface (upper surface) of the first pyroelectric material 26 and the electrode disposed on the first surface (upper surface), between the second surface (lower surface) of the first pyroelectric material 26 and the electrode disposed on the second surface (lower surface), between the first surface (upper surface) of the second pyroelectric material 27 and the electrode disposed on the first surface (upper surface), and between the second surface (lower surface) of the second pyroelectric material 27 and the electrode disposed on the second surface (lower surface).

The pressure-sensitive adhesive layers or adhesive layers Fa1, Fa2, Fb1, and Fb2 are not particularly limited as long as they are transparent and can bond a pyroelectric material and a conductive layer. They may be uniform or nonuniform layers. The pressure-sensitive adhesive layers or adhesive layers Fa1, Fa2, Fb1, and Fb2 are preferably, for example, acrylic-based double-sided adhesive sheets, and may have a base material layer. That is, the pressure-sensitive adhesive layers or adhesive layers can have a multilayer structure, for example, comprising:

(1) a layer composed of a pressure-sensitive adhesive or an adhesive, (2) a base material layer, and (3) a layer composed of a pressure-sensitive adhesive or an adhesive.

The base material layer may be a transparent film, and is preferably, for example, a polyimide film, a polyethylene terephthalate film, a polybutylene terephthalate film, a polycarbonate film, a polyparaphenylene sulfide film, or a polyamideimide film.

The protective layer 31 is provided on the surface of the upper conductive layer 25 opposite to the first pyroelectric material 26 and the second pyroelectric material 27, and the protective layer 32 is provided on the surface of the lower conductive layer 28 opposite to the first pyroelectric material 26 and the second pyroelectric material 27. Examples of the protective layers 31 and 32 include flexible resin sheets, such as polyimide, polyethylene terephthalate, polybutylene terephthalate, polycarbonate, polyparaphenylene sulfide, and polyamideimide.

The pressure-sensitive adhesive layers or adhesive layers Fa1, Fa2, Fb1, and Fb2 may have insulating properties. Since the influence of pyroelectric noise can be reduced even in such a case, the press pressure applied to the first pyroelectric material 26 or the second pyroelectric material 27 can be accurately detected.

The number of pressure-sensitive adhesive layers or adhesive layers is not limited thereto. A pressure-sensitive adhesive layer or adhesive layer may be provided at least between the upper conductive layer 25 and the first pyroelectric material 26, between the lower conductive layer 28 and the first pyroelectric material 26, between the upper conductive layer 25 and the second pyroelectric material 27, or between the lower conductive layer 28 and the second pyroelectric material 27. That is, at least any of the pressure-sensitive adhesive layers or adhesive layers Fa1, Fa2, Fb1, and Fb2 may be omitted.

Figure 20:
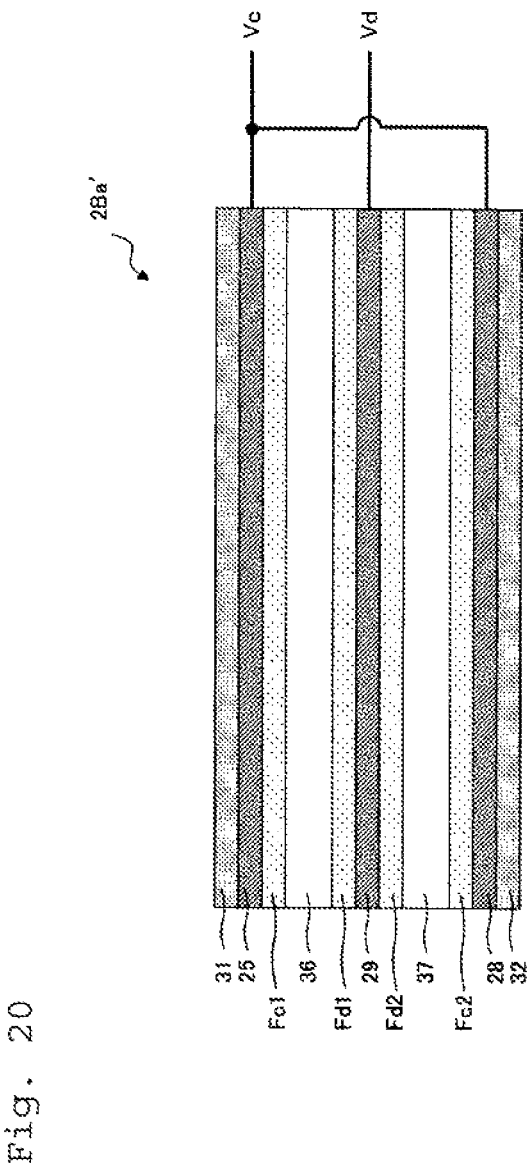
FIG. 20 is a cross-sectional view showing the structure of a piezoelectric element structure according to a modification of Embodiment 3.

FIG. 20 is a cross-sectional view showing the structure of a piezoelectric element structure 2Ba' according to a modification of the piezoelectric element structure 2Ba shown in FIG. 8. Similar to the piezoelectric element structure 2Ba, the piezoelectric element structure 2Ba' comprises an upper conductive layer 25, a lower conductive layer 28, an intermediate conductive layer 29, a first pyroelectric material 36, and a second pyroelectric material 37. Further, the piezoelectric element structure 2Ba' comprises four pressure-sensitive adhesive layers or adhesive layers Fc1, Fc2, Fd1, and Fd2, and two protective layers 31 and 32. The pressure-sensitive adhesive layers or adhesive layers Fc1, Fc2, Fd1, and Fd2 are provided, respectively, between the upper conductive layer 25 and the first pyroelectric material 36, between the second pyroelectric material 37 and the lower conductive layer 28, between the first pyroelectric material 36 and the intermediate conductive layer 29, and between the intermediate conductive layer 29 and the second pyroelectric material 37. In other words, the pressure-sensitive adhesive layers or adhesive layers Fc1, Fc2, Fd1, and Fd2 are provided, respectively, between the first surface (upper surface) of the first pyroelectric material 36 and the electrode disposed on the first surface (upper surface), between the first surface (lower surface) of the second pyroelectric material 37 and the electrode disposed on the first surface (lower surface), between the second surface (lower surface) of the first pyroelectric material 36 and the electrode disposed on the second surface (lower surface), and between the second surface (upper surface) of the second pyroelectric material 37 and the electrode disposed on the second surface (upper surface).

The pressure-sensitive adhesive layers or adhesive layers Fc1, Fc2, Fd1, and Fd2 can be formed with the same material as that of the pressure-sensitive adhesive layers or adhesive layers Fa1, Fa2, Fb1, and Fb2. Moreover, the protective layers 31 and 32 can be formed with the same material as that of the protective layers 31 and 32 shown in FIG. 19.

The pressure-sensitive adhesive layers or adhesive layers Fc1, Fc2, Fd1, and Fd2 may have insulating properties. Since the influence of pyroelectric noise can be reduced even in such a case, the press pressure applied to the first pyroelectric material 36 and the second pyroelectric material 37 can be accurately detected.

The number of pressure-sensitive adhesive layers or adhesive layers is not limited thereto, and at least any of the pressure-sensitive adhesive layers or adhesive layers Fc1, Fc2, Fd1, and Fd2 may be omitted.

Figure 21:
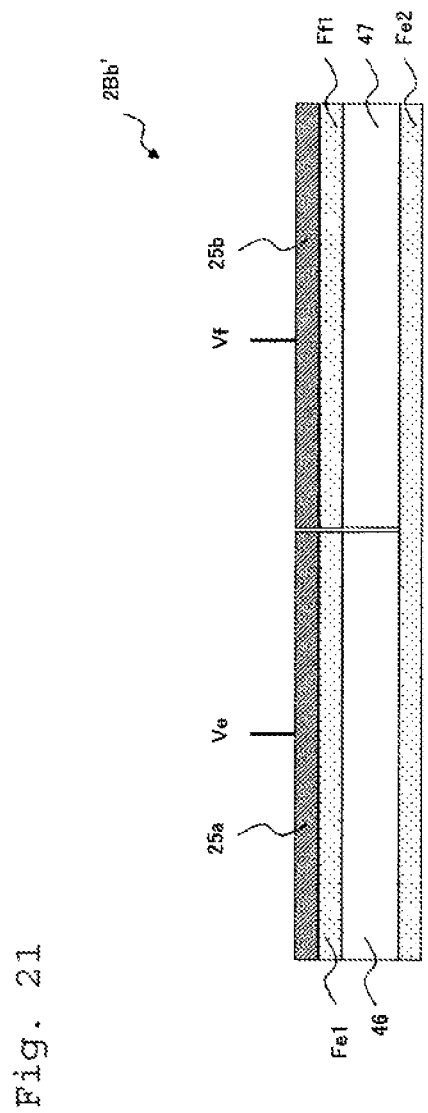
FIG. 21 is a cross-sectional view showing the structure of a piezoelectric element structure according to another modification of Embodiment 3.

FIG. 21 is a cross-sectional view showing the structure of a piezoelectric element structure 2Bb' according to a modification of the piezoelectric element structure 2Bb shown in FIG. 12. Similar to the piezoelectric element structure 2Bb, the piezoelectric element structure 2Bb' comprises two upper conductive layers 25a and 25b, a first pyroelectric material 46, and a second pyroelectric material 47. Further, the piezoelectric element structure 2Bb' comprises three pressure-sensitive adhesive layers or adhesive layers Fe1, Fe2, and Ff1. The pressure-sensitive adhesive layers or adhesive layers Fe1 and Ff1 are provided, respectively, between the upper conductive layer 25a and the first pyroelectric material 46, and between the upper conductive layer 25a and the second pyroelectric material 47. In other words, the pressure-sensitive adhesive layers or adhesive layers Fe1 and Ff1 are provided, respectively, between the first surface (upper surface) of the first pyroelectric material 46 and the electrode disposed on the first surface (upper surface), and between the first surface (upper surface) of the second pyroelectric material and the electrode disposed on the first surface (upper surface). Moreover, the pressure-sensitive adhesive layer or adhesive layer Fe2 is provided below the first pyroelectric material 46 and the second pyroelectric material 47. That is, the piezoelectric element structure 2Bb' is obtained by further providing pressure-sensitive adhesive layers or adhesive layers Fe1 and Ff1 in the piezoelectric element structure 2Bb shown in FIG. 12, and providing a pressure-sensitive adhesive layer or adhesive layer Fe2 in place of the lower conductive layer 28. The pressure-sensitive adhesive layers or adhesive layers Fe1, Fe2, and Ff1 can be formed with the same material as that of the pressure-sensitive adhesive layers or adhesive layers Fa1, Fa2, Fb1, and Fb2.

Moreover, protective layers for protecting the upper conductive layers 25a and 25b may be provided on the upper conductive layers 25a and 25b. The protective layers can be formed with the same material as that of the protective layers 31 and 32 shown in FIG. 19.

The pressure-sensitive adhesive layers or adhesive layers Fe1, Fe2, and Ff1 may have insulating properties. Since the influence of pyroelectric noise can be reduced even in such a case, the press pressure applied to the first pyroelectric material 46 or the second pyroelectric material 47 can be accurately detected.

The number of pressure-sensitive adhesive layers or adhesive layers is not limited thereto, and at least any of the pressure-sensitive adhesive layers or adhesive layers Fe1, Fe2, and Ff1 may be omitted.

Figure 22:
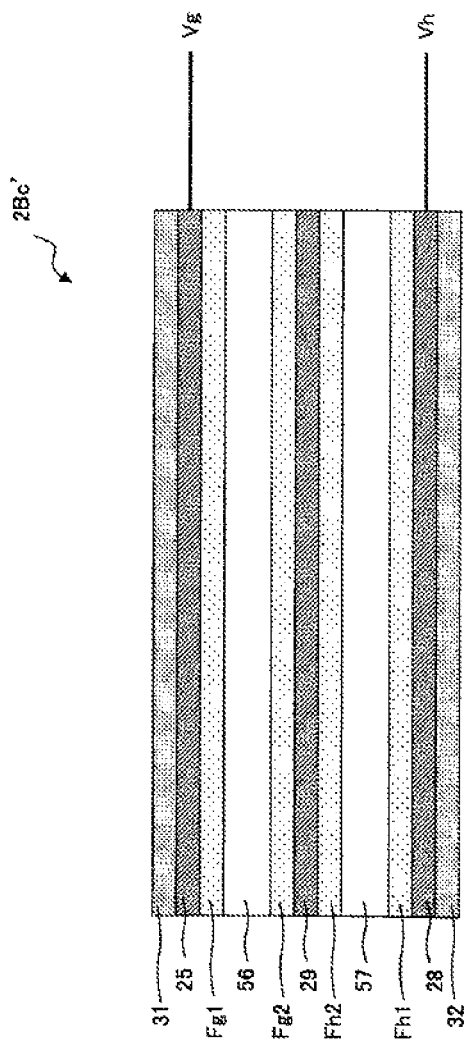
FIG. 22 is a cross-sectional view showing the structure of a piezoelectric element structure according to another modification of Embodiment 3.

FIG. 22 is a cross-sectional view showing the structure of a piezoelectric element structure 2Bc' according to a modification of the piezoelectric element structure 2Bc shown in FIG. 15. Similar to the piezoelectric element structure 2Bc, the piezoelectric element structure 2Bc' comprises an upper conductive layer 25, a lower conductive layer 28, an intermediate conductive layer 29, a first pyroelectric material 56, and a second pyroelectric material 57. Further, the piezoelectric element structure 2Bc' comprises four pressure-sensitive adhesive layers or adhesive layers Fg1, Fg2, Fh1, and Fh2, and two protective layers 31 and 32. The pressure-sensitive adhesive layers or adhesive layers Fg1, Fg2, Fh1, and Fh2 are provided, respectively, between the upper conductive layer 25 and the first pyroelectric material 56, between the first pyroelectric material 56 and the intermediate conductive layer 29, between the intermediate conductive layer 29 and the second pyroelectric material 57, and between the second pyroelectric material 57 and the lower conductive layer 28. In other words, the pressure-sensitive adhesive layers or adhesive layers Fg1, Fg2, Fh1, and Fh2 are provided, respectively, between the first surface (upper surface) of the first pyroelectric material 56 and the electrode disposed on the first surface (upper surface), between the second surface (lower surface) of the first pyroelectric material 56 and the electrode disposed on the second surface (lower surface), between the first surface (lower surface) of the second pyroelectric material and the electrode disposed on the first surface (lower surface), and between the second surface (upper surface) of the second pyroelectric material and the electrode disposed on the second surface (upper surface).

The pressure-sensitive adhesive layers or adhesive layers Fg1, Fg2, Fh1, and Fh2 can be formed with the same material as that of the pressure-sensitive adhesive layers or adhesive layers Fa1, Fa2, Fb1, and Fb2 described above. Moreover, the protective layers 31 and 32 can be formed with the same material as that of the protective layers 31 and 32 shown in FIG. 19.

The pressure-sensitive adhesive layers or adhesive layers Fg1, Fg2, Fh1, and Fh2 may have insulating properties. Since the influence of pyroelectric noise can be reduced even in such a case, the press pressure applied to the first pyroelectric material 56 or the second pyroelectric material 57 can be accurately detected.

The number of pressure-sensitive adhesive layers or adhesive layers is not limited thereto, and at least any of the pressure-sensitive adhesive layers or adhesive layers Fg1, Fg2, Fh1, and Fh2 may be omitted.

Figure 23:
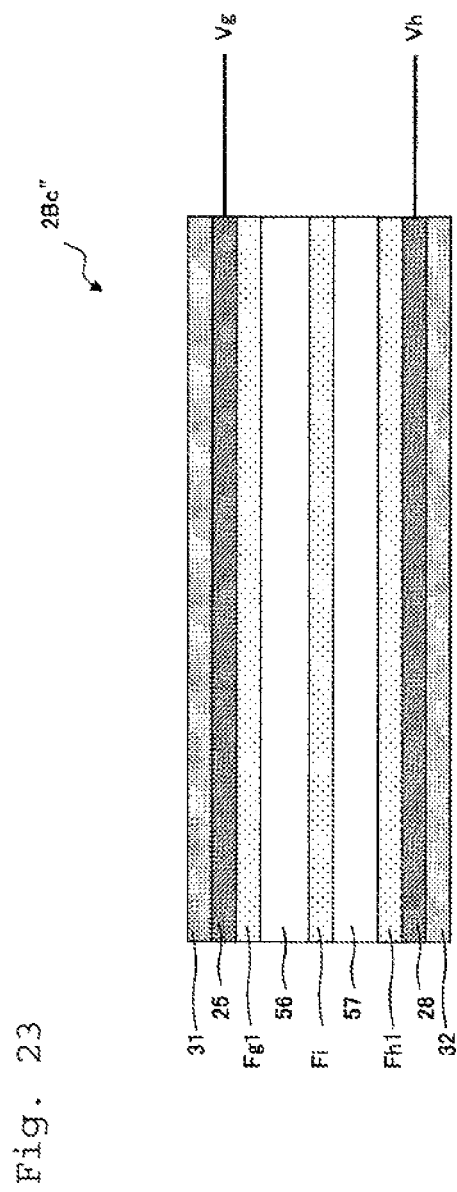
FIG. 23 is a cross-sectional view showing the structure of a piezoelectric element structure according to another modification of Embodiment 3.

FIG. 23 is a cross-sectional view showing the structure of a piezoelectric element structure 2Bc" according to another modification of the piezoelectric element structure 2Bc'. The piezoelectric element structure 2Bc" is obtained by providing a pressure-sensitive adhesive layer or adhesive layer Fi in the piezoelectric element structure 2Bc' in place of the intermediate conductive layer 29 and the pressure-sensitive adhesive layers or adhesive layers Fg2 and Fh2. That is, the piezoelectric element structure 2Bc" has a structure in which the first pyroelectric material 56 and the second pyroelectric material 57 are laminated so that the second surface (lower surface) of the first pyroelectric material 56 and the second surface (upper surface) of the second pyroelectric material 57 are opposite to each other, and in which the pressure-sensitive adhesive layer or adhesive layer Fi is provided between the second surface (lower surface) of the first pyroelectric material 56 and the second surface (upper surface) of the second pyroelectric material 57. In this case, the second surface of the first pyroelectric material 56 and the second surface of the second pyroelectric material 57 are insulated. Since the influence of pyroelectric noise can be reduced even in such a case, the press pressure applied to the first pyroelectric material 56 and the second pyroelectric material 57 can be accurately detected.

The number of pressure-sensitive adhesive layers or adhesive layers is not limited thereto, and at least any of the pressure-sensitive adhesive layers or adhesive layers Fg1, Fh1, and Fi may be omitted.

Additional Notes

The touch panel of the present invention can be any of various types of touch panels, such as resistance film-type touch panels and capacitance-type touch panels, as long as they have a pyroelectric material.

The present invention is not limited to the above embodiments, and various modifications can be made within the scope described in the claims. The technical scope of the present invention also includes embodiments obtained by suitably combining the technical means disclosed in the above embodiments. For example, the above embodiments describe the touch input devices that can detect a touch position on the touch panels; however, the present invention is not limited thereto. The technical scope of the present invention also includes touch sensors, etc., that detect press pressure applied to the touch panel, but do not detect a touch position. The touch sensor can be used in electronic devices (e.g., crash sensors and robot cleaners).

Moreover, in the above embodiments, one first pyroelectric material and one second pyroelectric material are provided; however, at least one of the first pyroelectric material and the second pyroelectric material may comprise a plurality of pyroelectric materials.

Furthermore, in the above embodiments, the touch position and press pressure are detected by different structures (a touch panel structure and a piezoelectric element structure); however, they may be detected by one structure. For example, a laminate of a first pyroelectric material and a second pyroelectric material (e.g., FIGS. 8 and 15) that are configured to be able to reduce pyroelectric noise may be inserted between a plurality of electrodes extending in the X-direction and a plurality of electrodes extending in the Y-direction. Specifically, in the touch panel 100 disclosed in JP2010-026938A, the piezoelectric material layer 3 may be replaced with the laminate of the first pyroelectric material and the second pyroelectric material in the embodiments of the present application.

When the touch panel of the present invention is pressed with a finger, etc., electrical signals corresponding to changes in strain with time of the sheet-like first and second pyroelectric materials can be obtained; therefore, the presence, speed, and size (strength) of pressing, their changes, or combinations thereof can be determined by using the touch panel. The size of pressing (i.e., static pressure) can be determined using integral values of the electrical signals.

According to the touch panel of the present invention, electrical signals by pyroelectricity are reduced, and electrical signals by piezoelectricity can be selectively obtained.

The touch panel of the present invention can be used in electronic devices, such as touch panel displays (touch panel monitors) of mobile phones (e.g., smartphones), personal digital assistants (PDAs), tablet PCs, ATMs, automatic ticket vending machines, digitizers, touchpads, car navigation systems, and FA (factory automation) equipment. The electronic devices allow operation and movement based on the touch position, touch pressure, or both (e.g., in paint software, the operation of changing the thickness of a line displayed on the screen depending on the writing pressure).

REFERENCE SIGNS LIST

1: Touch input device
2: Touch panel
2A: Touch panel structure
2B: Piezoelectric element structure
2B': Piezoelectric element structure
2Ba: Piezoelectric element structure
2Ba': Piezoelectric element structure
2Bb: Piezoelectric element structure
2Bb': Piezoelectric element structure
2Bc: Piezoelectric element structure
2Bc': Piezoelectric element structure
2Bc'': Piezoelectric element structure
3: Signal processing unit
4: Position detecting unit
5: Pressure detecting unit
21: Protective film
22: Sealing material
23: Spacer
24: Protective film
25: Upper conductive layer
25a: Upper conductive layer
25b: Upper conductive layer
26: First pyroelectric material
26a: Upper surface (first surface)
26b: Lower surface (second surface)
27: Second pyroelectric material
27a: Upper surface (first surface)
27b: Lower surface (second surface)
28: Lower conductive layer
29: Intermediate conductive layer
36: First pyroelectric material
36a: Upper surface (first surface)
36b: Lower surface (second surface)
37: Second pyroelectric material
37a: Upper surface (second surface)
37b: Lower surface (first surface)
46: First pyroelectric material
46a: Upper surface (first surface)
46b: Lower surface (second surface)
47: Second pyroelectric material
47a: Upper surface (first surface)
47b: Lower surface (second surface)
56: First pyroelectric material
56a: Upper surface (first surface)
56b: Lower surface (second surface)
57: Second pyroelectric material
57a: Upper surface (second surface)
57b: Lower surface (first surface)
Ea1, Ea2, Eb1, Eb2, Ec1, Ec2, Ed1, and Ed2: Electrodes
Ee1, Ee2, Ef1, Ef2, Eg1, Eg2, Eh1, and Eh2: Electrodes
Fa1, Fa2, Fb1, Fb2, Fc1, Fc2, Fd1, and Fd2: Pressure-sensitive adhesive layers or adhesive layers
Fe1, Fe2, Ff1, Fg1, Fg2, Fh1, Fh2, and Fi: Pressure-sensitive adhesive layers or adhesive layers

The invention claimed is:

1. A touch panel comprising sheet-like first and second pyroelectric materials, and capable of detecting press pressure applied to the first or the second pyroelectric materials;
wherein a first surface of the first pyroelectric material and a second surface of the second pyroelectric material are surfaces on which a first polar charge is generated when the temperature increases, and a second polar charge opposite to the first polar charge is generated when the temperature decreases;
a second surface of the first pyroelectric material and a first surface of the second pyroelectric material are surfaces on which the second polar charge is generated when the temperature increases, and the first polar charge is generated when the temperature decreases;
an electrode disposed on the first surface of the first pyroelectric material and an electrode disposed on the first surface of the second pyroelectric material are directly connected to each other, and
an electrode disposed on the second surface of the first pyroelectric material and an electrode disposed on the second surface of the second pyroelectric material are directly connected to each other, so that a charge of the first surface of the first pyroelectric material and a charge of the first surface of the second pyroelectric material are offset, and a charge of the second surface of the first pyroelectric material and a charge of the second surface of the second pyroelectric material are offset, when the temperature increases and decreases.

2. A touch panel comprising sheet-like first and second pyroelectric materials, and capable of detecting press pressure applied to the first or the second pyroelectric materials;
wherein a first surface of the first pyroelectric material and a first surface of the second pyroelectric material are surfaces on which a first polar charge is generated when the temperature increases, and a second polar charge opposite to the first polar charge is generated when the temperature decreases;

a second surface of the first pyroelectric material and a second surface of the second pyroelectric material are surfaces on which the second polar charge is generated when the temperature increases, and the first polar charge is generated when the temperature decreases; and an electrode is disposed on each of the first and second surfaces of the first pyroelectric material and each of the first and second surfaces of the second pyroelectric material; and voltage signals are output from the electrodes disposed on the surfaces of the first pyroelectric material and the second pyroelectric material on which a same polar charge is generated when the temperature increases, the voltage signals being output so that a pyroelectric voltage of the first pyroelectric material and a pyroelectric voltage of the second pyroelectric material are offset when the temperature increases and decreases.

3. The touch panel according to claim 2, wherein the first pyroelectric material and the second pyroelectric material are laminated so that the second surface of the first pyroelectric material and the second surface of the second pyroelectric material are opposite to each other, and a pressure-sensitive adhesive layer or an adhesive layer is provided between the second surface of the first pyroelectric material and the second surface of the second pyroelectric material.

4. The touch panel according to claim 1, wherein the first pyroelectric material and the second pyroelectric material are placed in parallel.

5. The touch panel according to claim 4, which comprises a plurality of pyroelectric material pairs each comprising a pair of the first pyroelectric material and the second pyroelectric material that are adjacent to each other.

6. The touch panel according to claim 1, wherein the first pyroelectric material and the second pyroelectric material are laminated.

7. The touch panel according to claim 1, wherein the first pyroelectric material and the second pyroelectric material have a same shape.

8. The touch panel according to claim 1, wherein the first and second pyroelectric materials are organic piezoelectric films.

9. The touch panel according to claim 8, wherein the organic piezoelectric films are vinylidene fluoride films.

10. The touch panel according to claim 8, wherein the organic piezoelectric films are vinylidene fluoride/tetrafluoroethylene copolymer films.

11. A touch input device comprising the touch panel according to claim 1, and a pressure detecting unit for detecting press pressure applied to the touch panel based on a signal output from the touch panel.

12. An electronic device comprising the touch panel according to claim 1.

13. An electronic device comprising the touch input device according to claim 11.

14. The touch panel according to claim 1, wherein the first pyroelectric material and the second pyroelectric material are laminated so that the second surface of the first pyroelectric material and the second surface of the second pyroelectric material are opposite to each other, and electromotive force is generated by a piezoelectric effect in the first pyroelectric material and the second pyroelectric material when a touch operation is performed.

15. The touch panel according to claim 2, wherein the first pyroelectric material and the second pyroelectric material are laminated so that the second surface of the first pyroelectric material and the second surface of the second pyroelectric material are opposite to each other, and electromotive force is generated by a piezoelectric effect in the first pyroelectric material and the second pyroelectric material when a touch operation is performed.

* * * * *